US010162897B2

(12) United States Patent
Kang et al.

(10) Patent No.: US 10,162,897 B2
(45) Date of Patent: Dec. 25, 2018

(54) SYSTEM AND METHOD FOR PROVIDING KNOWLEDGE SHARING SERVICE BASED ON USER RELATIONSHIP INFORMATION OF SOCIAL NETWORK SERVICE

(71) Applicant: NAVER CORPORATION, Seongnam-Si, Gyeonggi-Do (KR)

(72) Inventors: Seok Ho Kang, Seoul (KR); Dong Hoi Kim, Gwangju-si (KR); Sung Do Choi, Seoul (KR)

(73) Assignee: Naver Corporation, Gyeonggi-do (KR)

( * ) Notice: Subject to any disclaimer, the term of this patent is extended or adjusted under 35 U.S.C. 154(b) by 720 days.

(21) Appl. No.: 14/557,855

(22) Filed: Dec. 2, 2014

(65) Prior Publication Data

US 2015/0154304 A1   Jun. 4, 2015

(30) Foreign Application Priority Data

Dec. 4, 2013  (KR) ......................... 10-2013-0150153

(51) Int. Cl.
*G06F 17/30*   (2006.01)
*H04L 29/08*   (2006.01)
*H04W 4/21*   (2018.01)

(52) U.S. Cl.
CPC .. *G06F 17/30867* (2013.01); *G06F 17/30457* (2013.01); *G06F 17/30657* (2013.01); *H04L 67/306* (2013.01); *H04W 4/21* (2018.02)

(58) Field of Classification Search
CPC ......... G06F 17/30867; G06F 17/30657; G06F 17/30457; H04L 67/306

(Continued)

(56) References Cited

U.S. PATENT DOCUMENTS 9,301,136 B2 *   3/2016   Kim ............................. 455/411
2011/0314516 A1 *  12/2011   Li et al. ......................... 726/3

(Continued)

FOREIGN PATENT DOCUMENTS

JP    2008158947 A    7/2008
JP    2010267298 A   11/2010

(Continued)

OTHER PUBLICATIONS

Zhengwei Huang et al., The Construction of Logistics Information Platform Based on Mobile Social Network Service, 2012, IEEE, 758-761.*

(Continued)

*Primary Examiner* — Jean B Fleurantin
(74) *Attorney, Agent, or Firm* — Harness, Dickey & Pierce, P.L.C.

(57) ABSTRACT

A knowledge sharing system includes a social network service (SNS) providing server that stores relationship information between a first user and a second user. The knowledge sharing system includes a knowledge sharing service providing server including a query data management unit that stores query data when the query data is transmitted from a first terminal of the first user and stores a query sharing request in association with the query data when the query sharing request is transmitted from a second terminal of the second user, and in the storing of the query sharing request, the query data management unit matches the query sharing request with the query data; and a query data providing unit that provides the query data matched with the query sharing request to a third terminal of a third user, where the third user is connected with the second user in the SNS platform.

15 Claims, 15 Drawing Sheets

(58) Field of Classification Search
USPC .......................................... 707/768; 455/411
See application file for complete search history.

(56) References Cited

U.S. PATENT DOCUMENTS

| | | |
|---|---|---|
| 2012/0143948 A1* | 6/2012 | Archambault et al. ....... 709/204 |
| 2012/0323686 A1 | 12/2012 | Burger et al. |
| 2013/0139070 A1 | 5/2013 | Baldwin et al. |
| 2014/0018040 A1* | 1/2014 | Kim .............................. 455/411 |
| 2014/0149583 A1* | 5/2014 | Gil et al. ...................... 709/224 |
| 2014/0214986 A1* | 7/2014 | Hwang et al. ................ 709/206 |
| 2015/0128071 A1* | 5/2015 | Yang et al. ................... 715/753 |

FOREIGN PATENT DOCUMENTS

| | | |
|---|---|---|
| JP | 2013161472 A | 8/2013 |
| JP | 2013165687 A | 8/2013 |
| JP | 2013178605 A | 9/2013 |
| TW | 201106167 A | 2/2011 |
| TW | 201301179 A | 1/2013 |
| WO | WO-2013143413 A1 | 10/2013 |

OTHER PUBLICATIONS

Taiwanese Office Action dated Jun. 1, 2016 for corresponding Taiwanese patent application No. 103141876.
Office Action for corresponding Japanese Application No. 2014/135717 dated Oct. 27, 2015.

\* cited by examiner

SYSTEM AND METHOD FOR PROVIDING KNOWLEDGE SHARING SERVICE BASED ON USER RELATIONSHIP INFORMATION OF SOCIAL NETWORK SERVICE

RELATED APPLICATION

This application claims the benefit of Korean Patent Application No. 10-2013-0150153, filed on Dec. 4, 2013, in the Korean Intellectual Property Office, the disclosure of which is incorporated herein in its entirety by reference.

BACKGROUND OF THE INVENTION

1. Field

One or more example embodiments relate to a system and method for providing a knowledge sharing service based on user relationship information of a social network service (SNS).

2. Description of the Related Art

Information and communication technology represented by the Internet and mobile communication has changed modern people's life patterns. As personal computers having Internet access have been supplied to almost all households, schools, and offices, information can be obtained through web sites, products can be purchased using electronic commerce, news can be exchanged using email, and the like. Just a few years ago, people were able to use only voice call-oriented mobile communication services with a mobile communication terminal. However, a wireless Internet service whereby Internet-based data communication services can be provided to even mobile communication terminals has recently been introduced.

Recently, much attention has been paid to social network services (SNSs) using wired/wireless Internet services. SNSs are systems that provide a platform for users to build social networks based on common interests and/or demographics. SNSs have enabled users to form social networks using the Internet, and are generally classified into web-based services, such as Facebook (http://www.facebook.com/), Twitter (http://www.twitter.com/), Cyworld (http://www.cyworld.com/), etc., and mobile-based services, such as Kakaotalk, Line, and the like.

Information disclosed in this Background section was already known to the inventors before achieving the inventive concept or is technical information acquired in the process of achieving the inventive concept. Therefore, it may contain information that does not form the prior art that is already known to the public in this country.

BRIEF SUMMARY OF THE INVENTION

At least one example embodiment relates to a knowledge sharing service providing system.

According to at least one example embodiment, a knowledge sharing service providing system includes a social network service (SNS) providing server and a knowledge sharing service providing server. The social network service (SNS) providing server provides a SNS platform and is configured to store relationship information between a first user and a second user, the relationship information between the first user and the second user indicates a connection between the first user and the second user. The knowledge sharing service providing server includes a processor. The processor includes a query data management unit configured to store query data received from a first terminal of the first user and store a query sharing request received from a second terminal of the second user in association with the query data, and in the storing of the query sharing request, the query data management unit is configured to match the query sharing request with the query data. The processor includes a query data providing unit configured to provide the query data matched with the query sharing request to a third terminal of a third user, the third user being connected with the second user in the SNS platform.

According to one or more example embodiments, the query data transmitted from the first user is associated with category information, and the query data providing unit is configured to provide the query data to the second terminal when at least a portion of the category information associated with the query data is the same as a portion of information associated with a category of interest selected by the second user.

According to one or more example embodiments, the query data providing unit is configured to provide the query data to the second terminal based on a level of intimacy indicated by the relationship information.

According to one or more example embodiments, the query data management unit is configured to receive reply data associated with the query data, and store the reply data in association with the query data, and in the storing of the reply data, the query data management unit is configured to match the reply data with the query data.

According to one or more example embodiments, at least one portion of the reply data associated with the query data is selected as a best reply by the first user.

According to one or more example embodiments, the query data providing unit is configured to provide the selected best reply to at least one of the second terminal and the third terminal.

According to one or more example embodiments, the query data providing unit is configured to transmit an indication to a user terminal that provided the selected portion of the reply data, the indication indicating that the selected portion of the reply data is selected as the best reply.

According to one or more example embodiments, a desired score is assigned to a user of the user terminal that provided the portion of the reply data selected as the best reply.

According to one or more example embodiments, the assigned score is set by the first user.

At least one example embodiment relates to a method of providing a knowledge sharing service by a knowledge sharing service providing server.

According to at least one example embodiment, a method of providing a knowledge sharing service by a knowledge sharing service providing server includes receiving, by a processor, query data from a first terminal of a first user, the first user being connected to a second user according to relationship information between the first user and the second user, the relationship information between the first user and the second user being defined by a social network service (SNS); transmitting, by the processor, the query data to a second terminal of the second user based on the relationship information between the first user and the second user; providing, by the processor, a control element for selecting a query sharing request, the query sharing request allowing the second user to share the query data with a third user, the third user being connected to the second user according to relationship information between the second user and the third user, the relationship information between the second user and the third user being defined by the SNS; storing, by the processor, information for transmitting the query data to a third terminal of the third user when the second user selects the query sharing request using the control element; and transmitting, by the processor, the query data to the third terminal according to the stored information for transmitting the query data.

According to one or more example embodiments, the query data is associated with category information, and the transmitting the query data to the second terminal includes transmitting the query data to the second terminal when at least a portion of the category information associated with the query data is the same as a portion of information associated with a category of interest selected by the second user.

According to one or more example embodiments, the second user is selected by the first user based on the relationship information between the first user and the second user.

According to one or more example embodiments, the method further includes providing a control element for inputting reply data in response to the query data; and when the reply data is input using the control element, transmitting the reply data to at least one of the first terminal, the second terminal, and the third terminal.

According to one or more example embodiments, the method further includes providing the first user with a control element for setting a score to be associated with the query data, the score being assigned to a user who inputs the reply data.

At least one example embodiment relates to a processor of a knowledge sharing service providing server.

According to at least one example embodiment, a knowledge sharing service providing server includes a processor configured to obtain first relationship information between a first user and a second user and second relationship information between the second user and a third user, the first relationship information and the second relationship information being defined by a social network service (SNS); receive query data from a first terminal of the first user; provide the received query data to a second terminal of the second user based on the first relationship information; receive a query sharing request from the second terminal; provide the received query data to a third terminal of the third user based on the received query sharing request and the second relationship information; receive reply data from at least one of the first terminal, a second terminal of the second user, and a third terminal of a third user; and provide the reply data to at least one of the first terminal, the second terminal, and the third terminal.

According to one or more example embodiments, the processor is further configured to store the received query sharing request in association with the query data; and store the received reply data in association with the received query data.

According to one or more example embodiments, the processor is further configured to obtain relationship information between the first user and each of a plurality of other users within the SNS in real time; and provide the received query data to selected ones of the plurality of other users.

According to one or more example embodiments, the processor is further configured to receive a plurality of query sharing requests from corresponding ones of a plurality of terminals; and distribute at least a portion of the query data to other users within the SNS according to each received one of the plurality of query sharing requests.

According to one or more example embodiments, the processor is further configured to receive a plurality of query sharing requests from corresponding ones of a plurality of terminals; and distribute at least a portion of the query data to other users within the SNS according to each received one of the plurality of query sharing requests.

At least one example embodiment relates to a computer-readable medium that includes program code, which when executed by a processor, configures the processor to provide a knowledge sharing service.

According to at least one example embodiment, a computer-readable medium that includes program code, which when executed by a processor, configures the processor to receive query data from a first terminal of a first user, the first user being connected to a second user according to relationship information between the first user and the second user, the relationship information between the first user and the second user being defined by a social network service (SNS); transmit the query data to a second terminal of the second user based on the relationship information between the first user and the second user; provide a control element for selecting a query sharing request, the query sharing request allowing the second user to share the query data with a third user, the third user being connected to the second user according to relationship information between the second user and the third user, the relationship information between the second user and the third user being defined by the SNS; and transmit the query data to a third terminal of the third user when the second user selects the query sharing request using the control element.

One or more example embodiments provide that the providing of the query data to the user terminals may include providing a best reply to the query data to a user who registers a query sharing request for the query data when the best reply is registered.

One or more example embodiments provide that the providing of the query data to the user terminals may include providing a best reply to the query data to a user who registers reply data for the query data when the best reply is registered.

One or more example embodiments provide that a desired point and/or score may be assigned to a user who registers the best reply.

One or more example embodiments provide that the assigned point and/or score may be set beforehand when the query data is registered.

One or more example embodiments provide that the providing of the query data to the user terminals may further include providing recommended query data to one or more other users.

One or more example embodiments provide that the query data provided to the user terminals may include at least one among information regarding a user who registers and/or shares the query, a time when the query is registered and/or shared, the content of the query, the number of times that a query sharing request requesting the query is registered and/or submitted, the number of times that reply data for the query is registered and/or submitted, and a point and/or score assigned to the query.

One or more example embodiments provide that when the query data is input using the user terminal, information regarding a category to which the query data is to be registered may be input or at least one recipient who will receive the query data may be selected among users who are contacts.

One or more example embodiments provide that either the inputting of the category information or the inputting of information regarding a recipient may be performed.

Other aspects, features, and advantages will be apparent from the drawings, claims, and the detailed description appended herein.

The one or more of the above aspects may be realized using a system, a method, a computer program, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
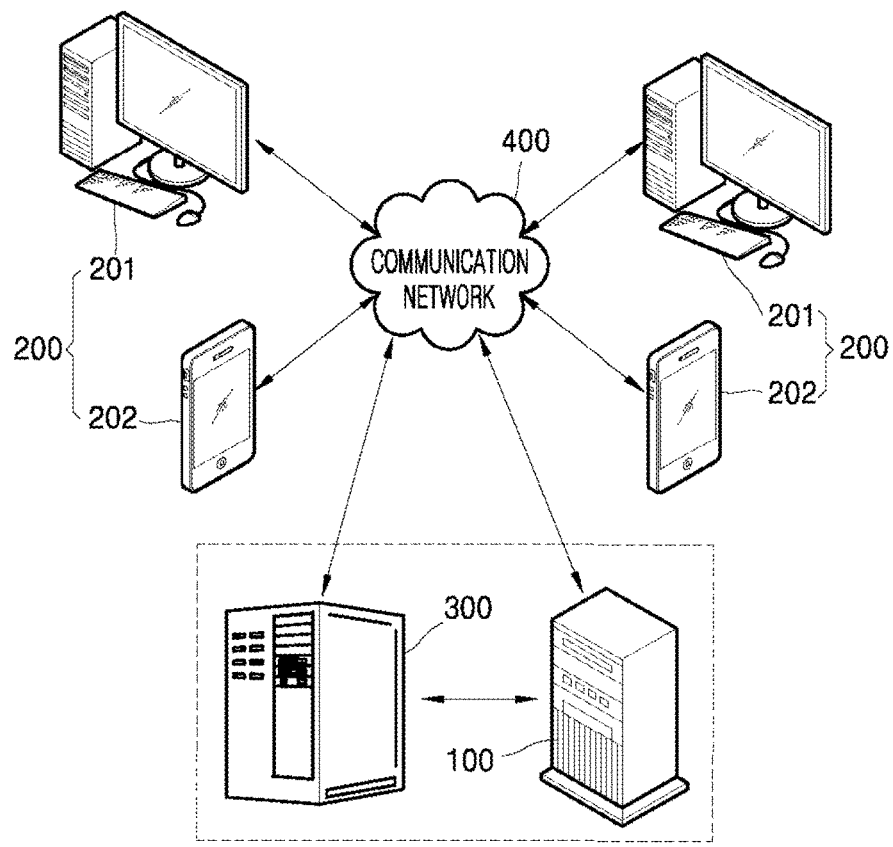
FIG. 1 is a diagram illustrating the structure of a knowledge sharing service providing system according to an example embodiment.

The inventive concept may be embodied in many different forms and realized in various embodiments, and example embodiments will be illustrated in the drawings and specifically described in the present disclosure. Advantages and features of the inventive concept and methods of achieving them will be apparent from the example embodiments set forth herein together with the drawings. However, the inventive concept should not be construed as being limited to the example embodiments set forth herein and may have different forms. In the present embodiments, it will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the drawings, lengths and sizes of layers and regions may be exaggerated for clarity. For example, the sizes and thicknesses of the elements illustrated in the drawings are arbitrarily shown and thus the inventive concept is not limited thereto. As used herein, the term "and/or" includes any and all combinations of one or more of the associated listed items. Expressions such as "at least one of" when preceding a list of elements, modify the entire list of elements and do not modify the individual elements of the list.

Hereinafter, example embodiments will be described in detail with reference to the accompanying drawings. In this regard, the same or corresponding elements will be denoted by the same reference numerals and will not be redundantly described.

FIG. 1 is a diagram illustrating the structure of a knowledge sharing service providing system based on user relationship information of a social network service (SNS), according to an example embodiment.

Referring to FIG. 1, the knowledge sharing service providing system according to an example embodiment includes user terminals 200, an SNS providing server 300 for providing a SNS service to the user terminals 200, a knowledge sharing service providing server 100 for storing and sharing query data based on user relationship information provided from the SNS providing server 300, and a communication network 400 for connecting the user terminals 200, the knowledge sharing service providing server 100, and the SNS providing server 300.

First, a social network service (SNS) on which an example embodiment is based will be described. An SNS may be any platform and/or service that enables a user to (i) strengthen relations with his/her contacts, such as friends, seniors, juniors, colleagues, etc., on the Internet; (ii) make new connections with individuals and/or organizations; and/or form a wide human network (human relationships) based on common interests, shared demographics, and the like. The SNS may be considered as one-person media or a one-person community that enables users to share their own individual information and that helps users communicate with each other.

As each individual's desire for expression becomes stronger, SNSs enabling people to build social relations and maintain friendships have been developed more and more. A community service, such as a cafe, a club, or the like on the Web, is a service whereby people who are interested in a particular theme form a group and share closed services, whereas an SNS is a service whereby a user himself/herself/themselves (i.e., an individual), shares his/her/their matters of interest and personal matters with others.

SNSs were primarily developed to promote friendship among individuals and/or enjoy entertainment. However, SNSs are tending to be used for creative purposes (e.g., a business purpose, sharing of various information, etc.). Also, a large number of people are searching for and using latest information (e.g., news) using an SNS rather than using the Internet and/or other forms of media. This is because some users believe that information shared based on a friend's recommendation is more reliable than information provided through the Internet and/or traditional forms of media. Additionally, information can be delivered to users using a SNS in a simpler way than information detected through a general search engine.

However, the existing SNSs are not intended to share professional knowledge and may be ineffectual and/or incapable of functioning as knowledge sharing services for delivering and sharing a query and a reply thereto.

To solve this problem, example embodiments provide a knowledge sharing service providing system that may provide information to a user based on the user's SNS relationship information. According to an example embodiment, the knowledge sharing service providing server 100 as shown in FIG. 1 may provide a knowledge sharing service, whereby a first user who is a contact of a second user is asked a query based on relationship information between the first user and the second user. According to various example embodiments, the knowledge sharing service providing server 100 may also spread a query of a user to other users who are contacts of the user by requesting to share the query, thereby rapidly delivering the query to reliable answerers and receiving a reliable reply, as will be described in detail with reference to FIGS. 3 to 15 below.

Referring back to FIG. 1, the user terminals 200 may be understood as communication terminals, mobile terminals, user equipment, and the like, through which a web service may be used in a wire/wireless communication environment. According to various embodiments, user terminals 200 are physical hardware devices that are capable of running one or more applications. User terminals 200 may include a transmitter/receiver (or alternatively, a transceiver), memory, one or more processors, and/or other like components. User terminals 200 may be configured to send/receive data to/from SNS providing server 300 and/or knowledge sharing service providing server 100. User terminals 200 may be designed to sequentially and automatically carry out a sequence of arithmetic or logical operations; equipped to record/store digital data on a machine readable medium; and transmit and receive digital data via communication network 400. User terminals 200 may be configured to run, execute, or otherwise operate one or more applications. The applications may include native applications, web applications, and hybrid applications. User terminals 200 may include wireless phones or smartphones, desktop personal computers (PCs), laptop PCs, tablet PCs, wearable computing devices, and/or any other physical or logical device capable of recording, storing, and/or transferring digital data via a network (e.g., communication network 400). As shown in FIG. 1, the user terminals 200 may include a personal computer 201 and/or a portable terminal 202 belonging to a user. Although FIG. 1 illustrates that the portable terminal 202 is a smartphone, the inventive concept is not limited thereto and any user devices having a web browsing function may be employed without limitation as described above.

User terminals 200 may include one or more memory devices. The one or more memory devices are a hardware devices configured to store an operating system (OS) and program code for one or more software components. The one or more memory devices may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into the one or more memory devices using a drive mechanism (not shown). Such separate computer readable storage medium may include a Blue-ray, DVD/CD-ROM disc drive, memory card, memory stick, removable flash drive, sim card, and/or other like computer readable storage medium (not shown). In some embodiments, software components may be loaded into the one or more memory devices via network interface, rather than via a computer readable storage medium.

User terminals 200 may include one or more processors. The one or more processors may be configured to carry out instructions of a computer program by performing the basic arithmetical, logical, and input/output operations of the system. The one or more processors may include a single-core processor, a dual-core processor, a triple-core processor, a quad-core processor, one or more digital signal processors (DSPs), application-specific-integrated-circuits, field programmable gate arrays (FPGAs) and/or the like. The one or more processors may perform a variety of functions for the user terminals 200 and may process data by executing program code, one or more software modules, firmware, middleware, microcode, hardware description languages, and/or any other like set of instructions stored in the one or more memory devices. The program code may be provided to the one or more processors by the one or more memory devices, one or more drive mechanisms (not shown), and/or via a network (e.g., communication network 400). In order to perform the variety of functions and data processing operations according to the example embodiments delineated herein, the program code and/or software components are loaded into the one or more processors. Once the program code is loaded into the one or more processors, the one or more processors may be programmed to perform the various operations and functions delineated by the program code, thereby transforming the one or more processors into a special purpose processor.

User terminals 200 may include may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of user terminals 200, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of the user terminals 200. The user terminals 200 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. User terminals 200 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

Communication network 400 may be any network that allows computing devices to exchange data. Communication network 400 may include one or more network elements (not shown) capable of physically or logically connecting computers and/or network elements. As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. In various embodiments, communication network 400 may be the Internet. In various embodiments, communication network 400 may be may be a Wide Area Network (WAN) or other like network that covers a broad area, such as a personal area network (PAN), local area network (LAN), campus area network (CAN), metropolitan area network (MAN), a virtual local area network (VLAN), or any other like network capable of physically or logically connecting computers. Additionally, in various embodiments, communication network 400 may be a private and/or secure network, which is used by a single organization (e.g., a business, a school, a government agency, and the like). The communication network 400 connects the user terminals 200, the knowledge sharing service providing server 100, and the SNS providing server 300. That is, the communication network 400 may be understood as a communication network that provides an access path via which the user terminals 200 may access the knowledge sharing service providing server 100 and/or the SNS providing server 300 to transmit packet data thereto or receive packet data therefrom.

SNS providing server 300 and knowledge sharing service providing server 100 are a network elements that may include one or more systems and/or applications for providing one or more services. SNS providing server 300 and knowledge sharing service providing server 100 may include one or more processors, memory or computer readable storage medium, and a network interface. In some embodiments, SNS providing server 300 and knowledge sharing service providing server 100 may include a transmitter/receiver connected to one or more antennas. The SNS providing server 300 and knowledge sharing service providing server 100 may be any network element capable of receiving and responding to requests from one or more client devices (e.g., user terminals 200) across a computer network (e.g., communication network 400) to provide one or more services. Accordingly, SNS providing server 300 and knowledge sharing service providing server 100 may be configured to communicate with the user terminals 200 via a wireless protocol. Additionally, SNS providing server 300 and/or knowledge sharing service providing server 100 may be a single physical hardware device, or SNS providing server 300 and/or knowledge sharing service providing server 100 may be physically or logically connected with other network devices, such that the SNS providing server 300 and/or knowledge sharing service providing server 100 may reside on one or more physical hardware devices. SNS providing server 300 and knowledge sharing service providing server 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). SNS providing server 300 and knowledge sharing service providing server 100 may be configured to establish, manage, and terminate communications sessions, for example between the SNS providing server 300 and user terminals 200, between knowledge sharing service providing server 100 and user terminals 200, and/or between SNS providing server 300 and knowledge sharing service providing server 100. SNS providing server 300 and knowledge sharing service providing server 100 may also be configured to establish, manage, and terminate communications sessions with two or more client devices. According to various embodiments, the user terminals 200, the knowledge sharing service providing server 100, and the SNS providing server 300 may communicate with each other via a communications network 400 as described above.

As discussed above, SNS providing server 300 and knowledge sharing service providing server 100 may include one or more processors (not shown) and one or more data storage devices (not shown). The one or more processors may be special purpose computer processing devices configured to carry out program code stored in the one or more storage devices by performing arithmetical, logical, and input/output operations. For example, program code and/or software modules may be loaded into the one or more processors. Once the program code and/or software modules are loaded into the one or more processors, the one or more processors may be configured to perform user operations according to various example embodiments.

The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules for performing operations according to various example embodiments. These software components may also be loaded from a separate computer readable storage medium into the one or more storage devices and/or the one or more processors using a drive mechanism (not shown). Such separate computer readable storage medium may include a floppy drive, disc, tape, Blu-ray/DVD/CD-ROM drive, memory card, removable flash memory drive, and/or other like computer readable storage medium (not shown). In some embodiments, software components may be loaded into the one or more storage devices and/or the one or more processors from a remote data storage device via a network interface, rather than via a computer readable storage medium.

SNS providing server 300 and knowledge sharing service providing server 100 may also include a transmitter and receiver. The transmitter and receiver may be any type of hardware device that generates or otherwise produces radio waves in order to communicate with one or more other devices. The transmitter and receiver may be coupled with an antenna (not shown) in order to transmit data to one or more other devices. The transmitter and receiver may be configured to receive digital data from one or more components of SNS providing server 300 and knowledge sharing service providing server 100, and convert the received digital data into an analog signal for transmission over an air interface. The transmitter and receiver may be any type of hardware device that can receive and convert a signal from a modulated radio wave into usable information, such as digital data. The transmitter and receiver may be coupled with the antenna (not shown) in order to capture radio waves. The transmitter and receiver may be configured to send digital data converted from a captured radio wave to one or more other components of SNS providing server 300 and knowledge sharing service providing server 100. SNS providing server 300 and knowledge sharing service providing server 100 may include a transceiver (not shown) instead of transmitter and receiver, where the transceiver is a single component configured to provide the functionality of a transmitter and a receiver as discussed above. The wireless transmitter/receiver and/or transceiver may be configured to operate in accordance with one or more wireless communications protocols and/or one or more cellular phone communications protocols. SNS providing server 300 and knowledge sharing service providing server 100 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other "wireless" communication protocols, including RF-based, optical (visible/invisible), and so forth.

Figure 3:
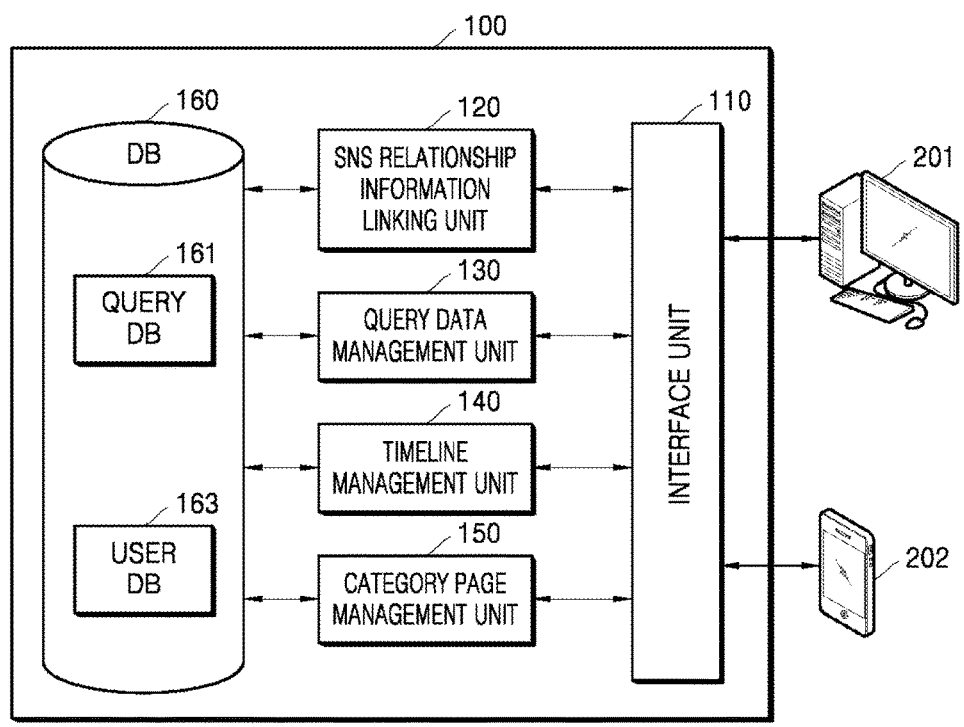
FIG. 3 is a block diagram of the internal structure of the knowledge sharing service providing server of FIG. 1 according to an example embodiment.

According to various embodiments, the SNS providing server 300 and the knowledge sharing service providing server 100 may be connected to one or more local and/or remote databases (see e.g., FIG. 3). In various embodiments, the one or more databases may include a database management system ("DBMS"), a relational database management system ("RDBMS") database, an object database ("ODBMS"), column-oriented DBMS, correlation database DBMS, and/or other like database management systems. In various embodiments, the one or more databases may be used by the SNS providing server 300 and/or the knowledge sharing service providing server 100 to store and record SNS-related content and/or advertising content.

Furthermore, in some embodiments, the SNS providing server 300 and/or the knowledge sharing service providing server 100 may include many more components than those discussed above, such as a display device, a network interface, and/or other like physical hardware components. However, it is not necessary that all of these generally conventional components be disclosed in order to disclose the example embodiments.

The SNS providing server 300 is a server configured to provide an SNS platform, which allows users to manage a personal representation of the user (e.g., a user profile); manage the user's social relationships by setting social/personal contacts and/or other like social links; and/or share content such as text, audio, video, flash animation, software applications, and the like. The SNS may provide a microblogging feature that allows each user to share or otherwise exchange content using short sentences, single images and/or video, and/or website links. Microblogging features are sometimes referred to as status updates, wall posts, tweets, and the like. Additionally, the SNS may allow users to list or otherwise aggregate content provided using microblogging features according to one or more users, one or more topics, one or more keywords, and/or any other like criteria. Such lists or aggregations of microblogging content are sometimes referred to as timelines, live feeds, dashboards, and the like. The SNS provided from the SNS providing server 300 may also include, for example, a messenger service, but is not limited thereto and other various SNSs managed by setting and managing a contact relationship between a large number of users may be provided from the SNS providing server 300.

The knowledge sharing service providing server 100 is a server that provides a knowledge sharing service based on user relationship information provided from the SNS providing server 300. In various embodiments, the knowledge sharing service providing server 100 may provide a knowledge sharing service whereby a user who is a contact is asked a query based on relationship information between users. In various embodiments, the knowledge sharing service providing server 100 may provide a knowledge sharing service whereby a user who receives a query spreads the query to other users who are contacts of the user by requesting to share the query, thereby rapidly delivering the query to reliable answerers and receiving a reliable reply, as will be described in detail with reference to FIGS. 3 to 15 below.

Furthermore, it should be noted that FIG. 1 shows two user terminals 200, one SNS providing server 300, and one knowledge sharing service providing server 100. However, according to various example embodiments, the knowledge sharing service providing system may include many more user terminals 200, multiple SNS providing servers 300, and/or multiple knowledge sharing service providing servers 100.

Figure 2:
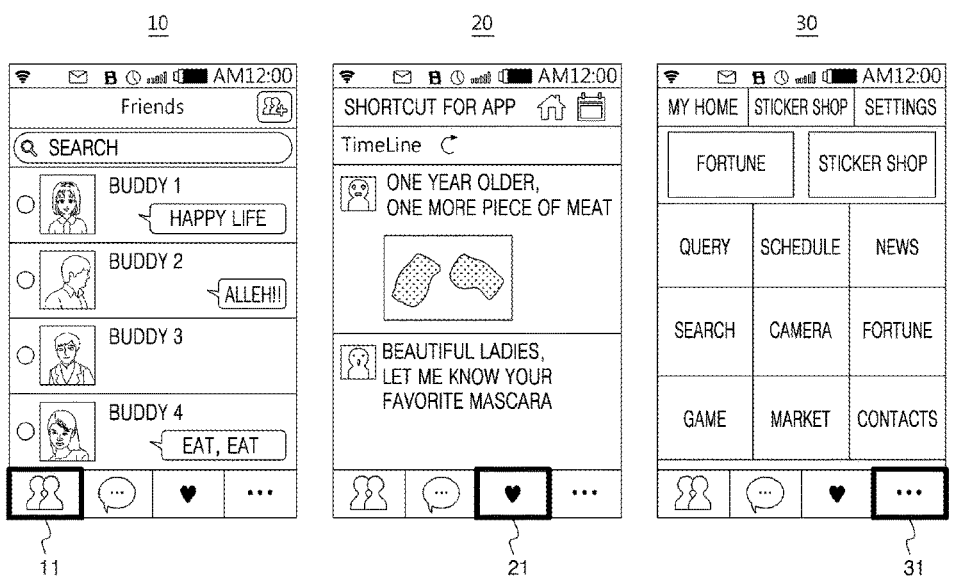
FIG. 2 illustrates examples of a screen providing various link services using a channel based on a messenger platform provided from a social network service (SNS) providing server of FIG. 1 according to an example embodiment.

FIG. 2 illustrates an example embodiment of a screen of a display device of a user terminal 200 that provides various link services using a channel based on a messenger platform provided from the SNS providing server 300 of FIG. 1.

A first screen 10 is an example of a screen displayed on a user terminal 200 to show a list of SNS friends or other like contacts and/or social links. In the first screen 10, a user interface 11 for displaying the list of friends is activated. As shown, the friends in the friends list are denoted as a "buddy", which represents a user name, user ID, and the like associated with each of the friends in the friends list. The list of friends may also display a message, such as an instant message or other like real-time text transmission associated with each of the listed friends.

A second screen 20 is an example of a screen displayed on the user terminal 200 that shows a timeline. In the second screen 20, a user interface 21 for displaying a timeline is activated. As noted above, the timeline may be a microblogging feature in which news and/or information about friends is displayed in a chronological order in association with various services provided using an SNS. For example, details of use of content of friends or activities of friends may be provided using the timeline in the form of an alarm. In this case, various items of information, such as user names, activities, the details of content, comments, etc., may be displayed using the timeline in chronological order.

A third screen 30 is an example of a screen displayed on the user terminal to show a list of applications made inside/outside the user terminals 200. In the third screen 30, a user interface 31 for displaying a list of applications is activated. Each of the listed applications may include a link to a website or online application store, where the website or online application store provides applications for download or provides a web-based service. That is, the third screen 30 is a channel for providing various application services using an SNS may be provided, and a user of the user terminal 200 may select and use a desired service provided by an application using the channel.

FIG. 2 illustrates cases in which a channel for links to application services is provided. Such applications may be manufactured for various services (e.g., games, events, communities, scheduling, messaging, battery usage, etc.), and provided in the form of a web application driven in association with an SNS application or in the form of a native application driven separately from the SNS application.

Native applications may be used for operating the user terminal 200, such as using a camera or other like image sensor of the user terminal 200, a GPS functionality of the user terminal 200, an accelerometer of the user terminal 200, cellular phone functionality of the user terminal 200, and other like functions of the user terminal 200. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on the user terminal 200 during manufacturing, or may be provided to the user terminal 200 by an application server operated by the SNS and/or any other like entity via a network (e.g. communication network 400).

Web applications are applications that load into a web browser of the user terminal 200. In embodiments where user terminal 200 is a mobile device, the web applications may be websites that are designed or customized to run on a mobile device by taking into account various mobile device parameters, such as resource availability, display size, touchscreen input, and the like. Web applications may be any server-side application that is developed with any server-side development tools and/or programming languages, such as PHP, Node.js, ASP.NET, and/or any other like technology that renders HTML.

If a user selects an application provided in the form of a native application, a link corresponding to the application may be linked when the application has been installed on a terminal and information for showing a method of downloading the application may be provided when the application is not installed in a terminal.

In this case, at least one link and/or application service may be provided to at least two users whose relationship is set based on relationship information between SNS users. That is, through an SNS, not only can various services be provided, but also at least one link and/or service using SNS relationship information may be provided. For example, a list of SNS friends may be applied to a link and/or service, such as a game, a schedule, and/or a fortune service so that a user may read fortunes with his/her SNS friends, deliver information regarding his/her schedule to his/her SNS friends by using a schedule service, and/or play games that include his/her SNS friends.

Here, a knowledge sharing service providing system according to various example embodiments may be provided as a link and/or service of SNS as described above to at least two users whose relationship is set based on relationship information between SNS users. Although FIG. 2 illustrates a messenger service as an example of an SNS, the inventive concepts are not limited thereto and a knowledge sharing service providing system according to an example embodiment is applicable to various SNS platforms.

FIG. 3 is a block diagram of the internal structure of the knowledge sharing service providing server 100 of FIG. 1.

Referring to FIG. 3, the knowledge sharing service providing server 100 included in the knowledge sharing service providing, system according to an example, embodiment includes an interface unit 110, an SNS relationship information linking unit 120, a query data management unit 130, a timeline management unit 140, a category page management unit 150, and a database (DB) 160.

It should be noted that the SNS relationship information linking unit 120, the query data management unit 130, the timeline management unit 140, and the category page management unit 150 may be provided as software modules that are included in one or more processors (not shown), which will be described in more detail below.

In detail, the interface unit 110 is a computer hardware component that connects the knowledge sharing service providing server 100 to a computer network (e.g., communication network 400) in order to communicate with user devices (e.g., user terminals 200). The interface unit 110 may also connect the knowledge sharing service providing server 100 to the SNS providing server 300 via the communication network 400 or via a back-end connection. The interface unit 110 may connect the knowledge sharing service providing server 100 to a computer network via a wired or wireless connection. The interface unit 110 may operate in conjunction with a wireless transmitter/receiver and/or transceiver (not shown) that is configured to operate in accordance with one or more wireless standards, or may operate in conjunction with one or more ports associated with a wired network protocol. The interface unit 110 may also include one or more virtual network interfaces configured to operate with one or more user devices and/or network elements, where each virtual network interface is used to communicate according to one or more network communications protocols. The interface unit 110 may be linked to the communication network 400 to provide a communication interface for providing a signal exchanged between the knowledge sharing service providing server 100 and the user terminal 200 in the form of packet data and/or any other data transmission types.

The SNS relationship information linking unit 120 receives relationship information between SNS users from the SNS providing server 300 and manages the relationship information. In this case, the SNS relationship information linking unit 120 may receive the relationship information between SNS users from the SNS providing server 300 and store this information in a desired (or alternatively "predetermined") cycle, and/or receive the relationship information between SNS users from the SNS providing server 300 in real time and use this information when necessary. The SNS relationship information linking unit 120 may enable the knowledge sharing service providing server 100 to receive the relationship information between SNS users from SNS providing server 300 and provide a knowledge sharing service by using the relationship information.

According to various embodiments, the relationship information indicates a connection between at least two users. In various embodiments, the relationship information may indicate a level of intimacy or other like measure of social relations between at least two users. The level of intimacy indicated by the relationship information may be based on a number of queries issued by a user that are answered by another user (i.e., a number of replies issued by a user in response to another user's queries), a number of times that a user shares another user's queries, a time period in which a user responds and/or shares another user's queries, and/or any other like methods of determining a level of intimacy between users.

The query data management unit 130 receives query data from the user terminal 200, stores the query data in a query database 161, and manages the query data. The query data transmitted from the user terminal 200 may contain information regarding a category to which a query belongs (e.g., one or more keywords, links, content and/or associated metadata), etc.), and/or the query data may contain information regarding a recipient to which the query data is to be transmitted.

When the query data management unit 130 receives a query sharing request requesting the query data, the query data management unit 130 may store the query sharing request in the query database 161 in association with the query data by matching the query data with the query sharing request. For example, in various embodiments, the query data management unit 130 may index the query sharing request according to information associated with the query sharing request and/or any other information associated with the query data and/or the user who submits the query sharing request. In this case, the stored query sharing request may include information regarding users who register the request to share the query data. If the request is stored to match the query data, when a best reply to the query data is selected, the best reply may be transmitted to a plurality of users who request to share the query data. When a best reply to query data is selected (i.e., when a query is solved), a desired (or alternatively "predetermined") mark or indicator may be displayed to indicate that a reply has been selected and/or that the query is solved.

When the query data management unit 130 receives reply data regarding the query data, the query data management unit 130 may store the reply data in the query database 161 in association with the query data by matching the query data with the reply data. For example, in various embodiments, the query data management unit 130 may index the reply data according to information associated with the reply data, a query sharing request, and/or any other information associated with the query data and/or the user who submits the reply data, etc. In this case, the stored reply data may include information regarding users who register or otherwise receive the reply data. As described above, if reply data is stored to match the query data, when a piece of reply data among a plurality of pieces of reply data related to the query data is selected as relevant reply data, the selected reply data may be transmitted to users who registers the reply data.

The timeline management unit 140 is an example embodiment of a query data providing unit configured to provide stored query data to the user terminal 200, and provide at least one piece of query data to the user terminal 200 so that the at least one piece or at least a portion of query data may be displayed on the user terminal 200 in the form of a timeline or other like microblogging feature. Although the timeline management unit 140 is illustrated as a query data providing unit in the present example embodiment, the inventive concepts are not limited thereto and various types of query data providing units capable of providing the user terminal 200 with query data (e.g., a message board management unit, a messenger management unit, etc.) are within the scope of the inventive concepts.

In this case, the timeline management unit 140 may provide and/or distribute query data registered by a user who is a contact, provide and/or distribute query data for which a query sharing request is registered or otherwise received by a user who is a contact, and/or provide and/or distribute query data registered to a category of interest registered beforehand and/or selected by a user to be displayed on the user terminal 200 in the form of a timeline. The timeline management unit 140 may further provide query data registered to or otherwise associated with a category of interest registered beforehand and/or selected by a user who is a contact. Otherwise, the timeline management unit 140 may provide query data to only a terminal of a user who is designated as a recipient or otherwise selected by a user who makes and submits the query data. In this case, the timeline management unit 140 may display the query data on a display device of the user terminal 200 in the form of a timeline in chronological order in which articles are posted or in the form of any other like microblogging feature.

The timeline management unit 140 may further provide recommended query data provided from the knowledge sharing service providing system. For example, the recommended query data may be a query for which the number of times reply data is registered rapidly increases, a query for which the number of times a request to share is registered is equal to or greater than a desired (or alternatively "predetermined") number, an unsolved query that is newly registered, and the like. The recommended query data may be provided in a desired (or alternatively "predetermined") cycle, period, or other like unit of time.

When query data is registered or otherwise received by a user who is a contact, a query sharing request is registered by a user who is a contact, query data is registered to a category of interest registered beforehand and/or selected by a user, or reply data or a query sharing request is registered in relation to query data registered by a user, this fact (or alternatively "event") may be provided to the user terminal 200 in the form of a push alarm, a notification alarm, and/or any other like notification.

The category page management unit 150 provides at least one piece of query data registered to at least one category to a category page displayed on the user terminal 200. That is, query data may be provided on the user terminal 200 such that a plurality of pieces of query data (for example, three pieces of query data) are displayed to correspond to a plurality of categories on a main category screen (see e.g., FIG. 8) provided when a category tab on the user terminal 200 is pressed. Also, when a user accesses an individual category screen (see e.g., FIG. 9), the category page management unit 150 may provide query data to the user terminal 200 such that a list of contacts who register a category as a category of interest from among the user's contacts and a plurality of pieces of query data registered to the category are displayed.

As shown, the database (DB) 160 includes the query DB 161 and a user DB 163. DB 160, the query DB 161, and the user DB 163 may include a database management system ("DBMS"), a relational database management system ("RD- BMS") database, an object database ("ODBMS"), column-oriented DBMS, correlation database DBMS, and/or other like database management systems. Furthermore, it should be noted that the DB 160 including the query DB 161 and the user DB 163 may be stored on the one or more data storage devices associated with the knowledge sharing service providing server 100.

In the query DB 161, not only the content of a query input by a user but also information regarding the user who registered the query, a time when the query was registered, a registered request to share the query, reply data registered in relation to the query, and a point and/or score set for the query may be stored.

The user DB 163 stores user information pertaining to users who use an SNS. The user information may include basic information regarding the users (e.g., the names of the users, groups to which the users belong, personal data of the users, demographic information, etc.), user login information (e.g., an identification (ID), a password (PW), etc.), and/or any other like information associated with a user of the SNS. The user information stored in the user DB 163 may be user information provided from the SNS providing server 300 and may further include user information stored in and managed by the knowledge sharing service providing server 100.

The user DB 163 may further store information regarding and/or associated with points and/or scores assigned to users. Here, a user may obtain a point when reply data that the user registered in relation to specific query data is selected as a best or otherwise relevant reply. Also, when a plurality of pieces of reply data are registered with respect to query data registered by the user, or when a plurality of requests to share the query data registered by the user are registered, the query data is considered as valuable and the user may additionally obtain points. In addition, the user may obtain points according to various scoring algorithms or other like algorithms.

Although not shown, the knowledge sharing service providing server 100, according to various example embodiments, may include a memory device, an input/output unit, a program storage unit, a controller, and/or other like components.

The memory device may store software modules for the SNS relationship information linking unit 120, the query data management unit 130, the timeline management unit 140, and the category page management unit 150 may be stored in memory device. The memory device may also temporarily store data processed by the SNS relationship information linking unit 120, the query data management unit 130, the timeline management unit 140, the category page management unit 150, etc., or may temporarily store data generated when a knowledge sharing service is provided to the user terminal 200.

The input/output unit displays not only a status of a process performed by inputting a key but also a status of a process performed by providing a knowledge sharing service.

The program storage unit is a hardware device that include control software for providing various knowledge sharing services by retrieving one or more software modules from the memory device, and providing the one or more software modules to a processor of the controller. Also, the control software of the program storage unit provides various knowledge sharing services including performing a service subscription process with respect to the user terminal 200 to which a knowledge sharing service is to be provided, storing information regarding a user who completes the service subscription process in the user database 163, receiving subscriber information from the user terminal 200 through which user authentication is requested, determining whether the subscriber information is the same as authentication information stored in the user database 163, receiving a query from the user terminals 200 and registering the query, providing query data and/or reply data to the user terminal 200 in the form of a timeline, and/or other like knowledge sharing services.

The controller is a type of a central processing unit (CPU) or one or more processors that controls processes of providing a knowledge sharing service to the user terminal 200 from the knowledge sharing service providing server 100. That is, the controller provides various knowledge sharing services, including driving the control software installed in the program storage unit, displaying query data and/or reply data, which is registered or shared by a user or a contact of the user, in the form of a timeline using the driven control software, etc. The one or more processors may be special purpose computer processing device configured to carry out the various functions and/or tasks for each of the SNS relationship information linking unit 120, the query data management unit 130, the timeline management unit 140, and the category page management unit 150 by performing arithmetical, logical, and/or input/output operations. For example, as noted above, the software modules for the SNS relationship information linking unit 120, the query data management unit 130, the timeline management unit 140, and the category page management unit 150 may be stored in the memory device. The SNS relationship information linking unit 120, the query data management unit 130, the timeline management unit 140, and the category page management unit 150 may be loaded into the one or more processors from the one or more storage devices. Once the software modules for the SNS relationship information linking unit 120, the query data management unit 130, the timeline management unit 140, and/or the category page management unit 150 are loaded into the one or more processors, the one or more processors may be configured to perform operations, functions, and/or tasks of the SNS relationship information linking unit 120, the query data management unit 130, the timeline management unit 140, and the category page management unit 150 according to various example embodiments disclosed herein.

As described above, according to an example embodiment, a knowledge sharing service is provided, where a first user who is a contact of a second user may be asked a query based on relationship information between the first user and the second user and/or other SNS users, and the second user who receives the query may request to share the query so as to spread the query to at least one other user who is a contact of the first user. In this way, the query may be rapidly delivered to reliable answerers, which may increase the likelihood that a reliable reply to the query may be obtained. In many embodiments, the spreading of the query may be considered a "viral phenomena" where queries, content, and/or other like objects are replicated throughout one or more SNSs by SNS users via messaging, microblogging, and the like. In some embodiments, the query may include advertising information, and the spreading of the query including the advertising information may allow an advertiser to spread brand awareness through a viral phenomenon, which is sometimes referred to as viral marketing stealth marketing, and the like.

Figure 4:
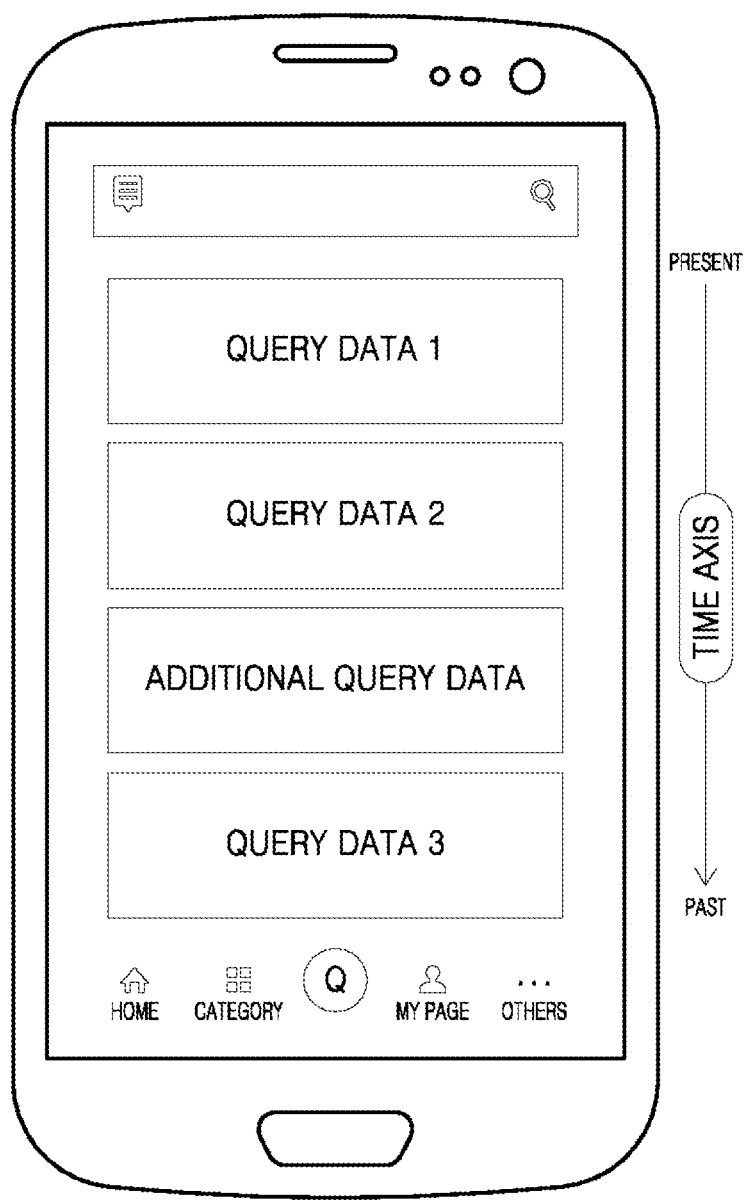
FIG. 4 is a conceptual diagram of a timeline provided from a knowledge sharing service providing system according to an example embodiment.

FIG. 4 is a conceptual diagram of a timeline provided from a knowledge sharing service providing system according to an example embodiment. As shown, the time line in FIG. 4 is displayed on a user terminal 202. As described above, a timeline may be understood as a region in which various query data may be displayed in chronological order in association with various services provided using a knowledge sharing service. For example, query data registered by a user who is a contact, query data for which a query sharing request is registered by a user who is a contact, query data registered to a category of interest registered beforehand and/or selected by a user, etc. may be displayed in the form of a timeline in chronological order. Otherwise, recommended query data provided from a knowledge sharing service providing system may be further displayed in the form of a timeline. It should be noted that, although FIG. 4 shows a timeline provided by a knowledge sharing service providing system, according to various example embodiments, the various services of the knowledge sharing service may be provided by any microblogging feature, which may be organized in any fashion, such as by topic, keyword, user identification information of one or more SNS users, and the like.

Figure 5:
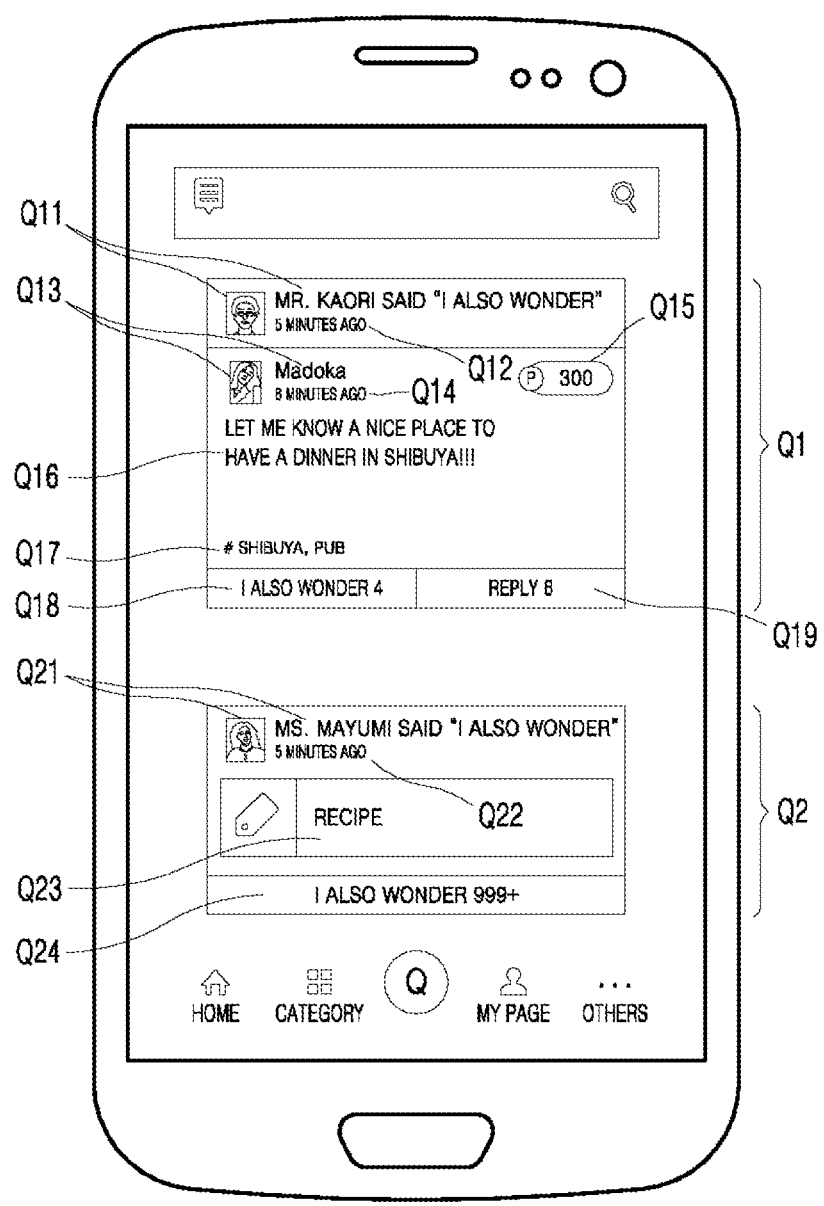
FIGS. 5 to 7 illustrate states in which a timeline provided from a knowledge sharing service providing system according to an example embodiment is displayed on a user terminal.
Figure 6:
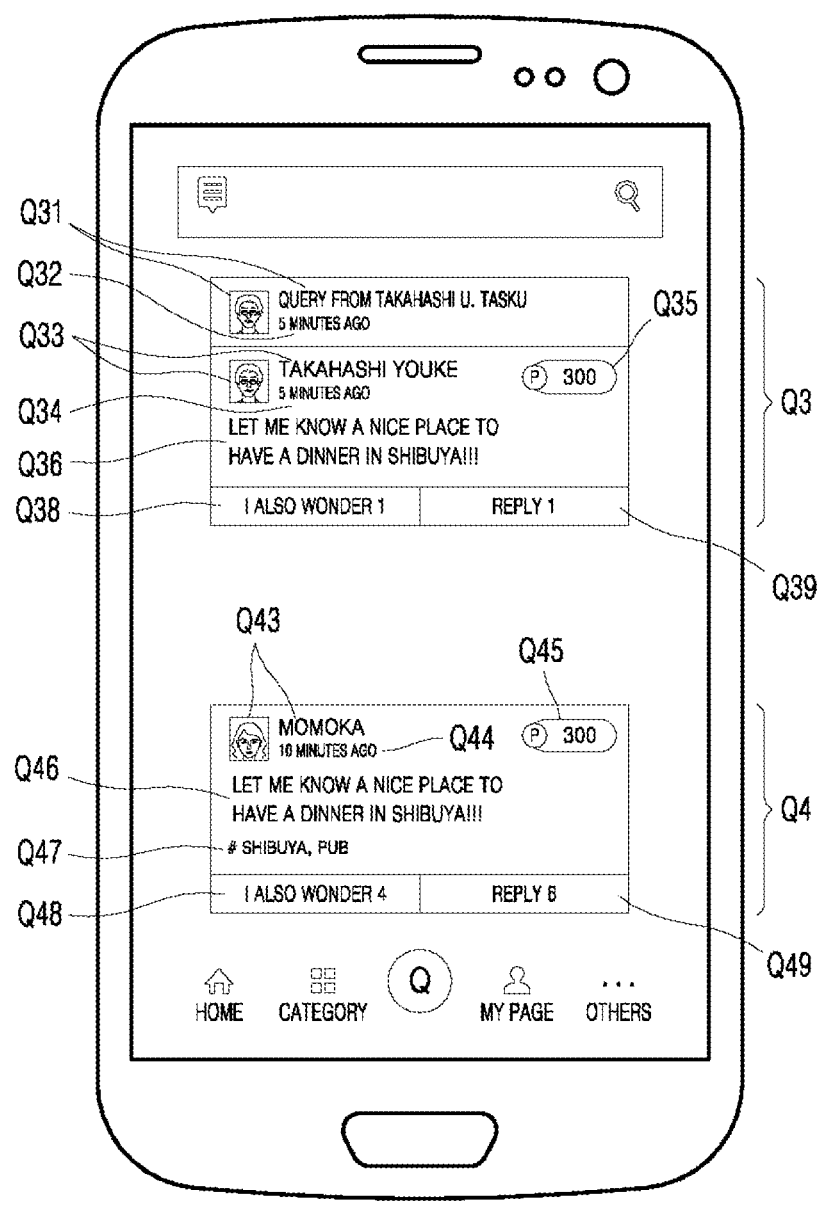
Figure 7:
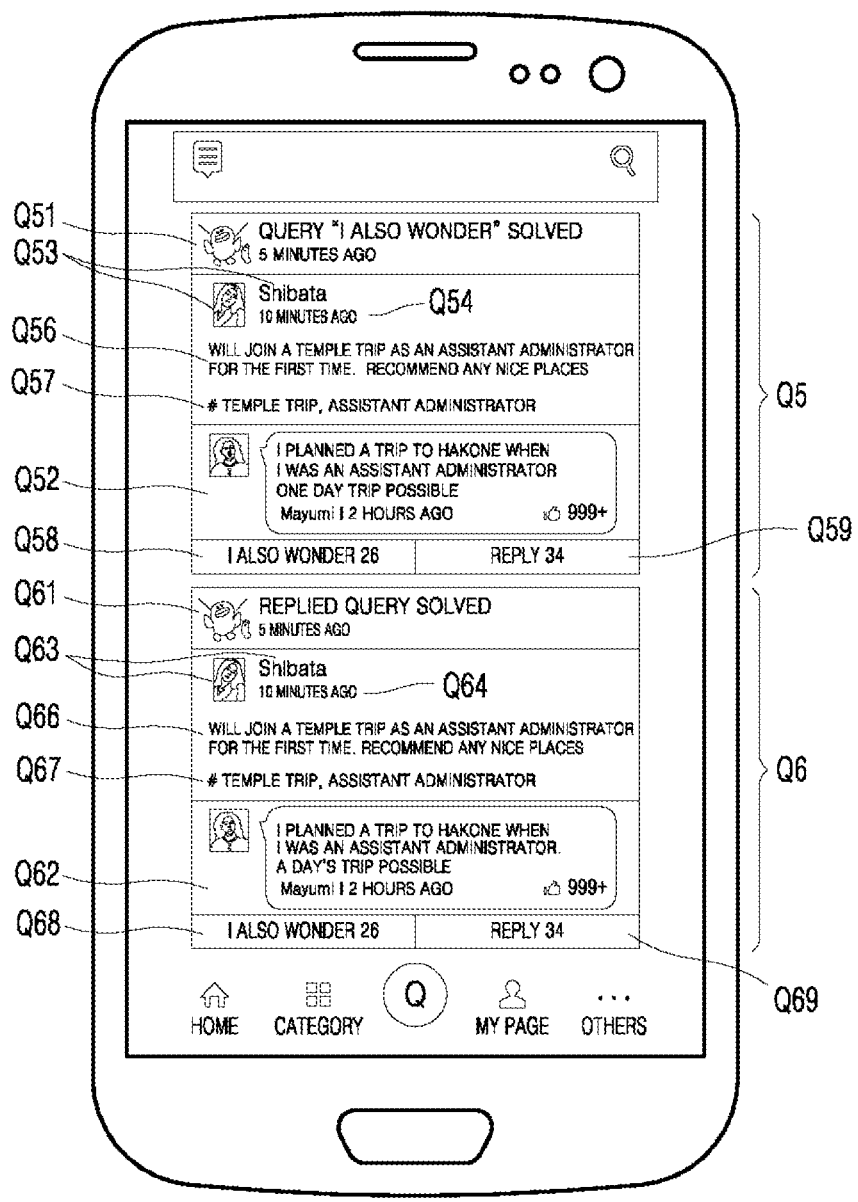

FIGS. 5 to 7 illustrate states in which a timeline provided from a knowledge sharing service providing system according to an example embodiment is displayed on a user terminal 202. As shown in FIGS. 5 to 7, a timeline is displayed on the display device of the user terminal 202, which is illustrated as a smartphone or other like mobile device. It should be noted that according to various embodiments, the timeline may be displayed on any other type of user terminal 200, such as a desktop personal computer (PC), a laptop PC, a tablet PC, a wearable computing device, and the like.

Referring to FIG. 5, first query data Q1 is query data for which a query sharing request is registered and/or shared by a user who is a contact. Here, the first query data Q1 may include user information Q11 regarding the user who registers the query sharing request (for example, a profile photo and a user name registered by the user) and a time Q12 when the query sharing request is registered and/or submitted. Also, the first query data Q1 may include user information Q13 regarding a user who registers and/or shares the query data (for example, a profile photo and a user name registered by the user), a time Q14 when the query data is registered and/or shared, a point Q15 assigned to a query, content Q16 of the query, and category information Q17 to which the query belongs. The point Q15 may be assigned to a query submitted by a user, where according to various embodiments, the user who submits the query may be provided with a graphical control element (e.g., a text box and/or field, one or more buttons, one or more radio buttons, one or more check boxes, a list box, a menu list, a drop-down box, etc.) that enables the user to choose a desired score and/or point value to be associated with the query data (not shown). The score and/or point value may be attributed to one or more other users who submit reply data in response to the query data. As shown in FIG. 5, the content Q16 includes text and the category information Q17 includes two keywords, one of which includes a hashtag label, which is a type of metadata tag. By entering the hash character (#) before a keyword, the keyword may become a hashtag label that allows for the grouping of similarly labeled keywords and allows SNS users to search or otherwise aggregate messages including the hashtag label. The first query data Q1 may further include a query sharing request register region Q18 for the query, which allows a user of the user terminal 202 to register and/or share the query. In the query sharing request register region Q18, a number of times the query sharing request is registered and/or shared with respect to the query may be displayed. As shown in FIG. 5, the number four (4) in the query sharing request register region Q18 may indicate that the query has been registered and/or shared four (4) times. In this case, when a user selects the query sharing request register region Q18, the query sharing request requesting the query data may be registered and/or shared. The first query data Q1 may further include a reply data register region Q19 for the query. In the reply data register region Q19, the number of times reply data is registered and/or shared for the query may be registered. As shown in FIG. 5, the number six (6) in the reply data register region Q19 may indicate that six (6) replies to the query have been registered and/or shared. When a user selects the reply data register region Q19, an individual query data page (see e.g., FIG. 11) may be moved to or otherwise displayed on the user terminal 202.

Second query data Q2 illustrated in FIG. 5 is query data registered and/or shared in a field registered as a category of interest by a user who is a contact. Here, the second query data Q2 may include user information Q21 regarding who registers and/or shares a category as the category of interest (for example, a profile photo and a user name registered by the user), and a time Q22 when the category is registered and/or shared as the category of interest. The second query data Q2 may further include a category display region Q23 in which the name of the category and the like are displayed. Additionally, the category display region Q23 may also include a link to a website or online application store for obtaining content, a software application, and the like associated with the category name shown by the category display region Q23. When a user selects the category display region Q23, an individual category screen (see e.g., FIG. 9) for the category may be moved to or otherwise displayed on the user terminal 202. The second query data Q2 may further include a query sharing request register region Q24 for the query, which allows a user of the user terminal 202 to register and/or share the query. In the query sharing request register region Q24, a number of times the query sharing request is registered with respect to the query may be displayed. As shown in FIG. 5, the number 999+ in the query sharing request register region Q24 may indicate that the query has been registered and/or shared more than 999 times, or at least 1000 times.

Referring to FIG. 6, third query data Q3 is query data registered by designating a user himself/herself as a recipient. The third query data Q3 may include user information Q31 of a user who registers and/or shares the query data (for example, a profile photo and a user name registered by the user), and a time Q32 when the query data is registered and/or shared. Also (or redundantly), the third query data Q3 may include user information Q33 regarding the user who registers and/or shares the query data (for example, the profile photo and the user name registered by the user), a time Q34 when the query data is registered and/or shared, a score Q35 assigned to the query, and content Q36 of the query. Furthermore, the third query data Q3 may further include a query sharing request register region Q38 and a reply data register region Q39 for the query.

Fourth query data Q4 of FIG. 6 is query data registered in a field registered as a category of interest registered by a user. Here, the fourth query data Q4 may include user information Q43 regarding a user who registers and/or shares the query data (for example, a profile photo and a user name registered by the user), a time Q44 when the query data is registered and/or shared, a score Q45 assigned to a query, content Q46 of the query, and category information Q47 to which the query belongs. Furthermore, the fourth query data Q4 may further include a query sharing request register region Q48 and a reply data register region Q49 for the query.

Referring to FIG. 7, fifth query data Q5 is query data for which a user registers a query sharing request and specific reply data is selected as a best reply. It should be noted that the term "best reply" may refer to a reply that a user who issues and/or shares the query deems to be a most relevant reply to the issued and/or shared query. Here, the fifth query data Q5 may include a query solution display region Q51 indicating that the query data is solved or selected as a best reply. The fifth query data Q5 may further include user information Q53 regarding the user who registers and/or shares the query data (for example, a profile photo and a user name registered by the user), a time Q54 when the query data is registered and/or shared, content Q56 of a query, and category information Q57 to which the query belongs. The fifth query data Q5 may further include a query sharing request register region Q58 and a reply data register region Q59 for the query. In this case, the query sharing request register region Q58 may be deactivated because the query is indicated as being solved. In various embodiments, the query sharing request register region Q58 may be indicated as inactive (or deactivated) by greying out a graphical control element (e.g., a button, etc.) representing the query sharing request register region Q58. The fifth query data Q5 may further include a best reply display region Q52 displaying the content of the reply selected as the best reply, a writer of the selected reply, a time when the selected reply was registered and/or shared, etc.

Referring to FIG. 7, sixth query data Q6 is query data for which a user registers reply data and specific reply data is selected as a best reply. Here, the sixth query data Q6 may include a query solution display region Q61 indicating that the query data is solved or otherwise selected as a best query. The sixth query data Q6 may further include user information Q63 regarding the user who registers and/or shares the query data (for example, a profile photo and a user name registered by the user), a time Q64 when the query data is registered and/or shared, content Q66 of the query, and category information Q67 to which the query belongs. The sixth query data Q6 may further include a query sharing request register region Q68 and a reply data register region Q69 for the query. The reply data register region Q69 may be deactivated because the query is indicated as being solved. The sixth query data Q6 may further include a best reply display region Q62 displaying the content of the reply selected as the best reply, a writer of the selected reply, a time when the reply is registered and/or shared, etc.

Figure 8:
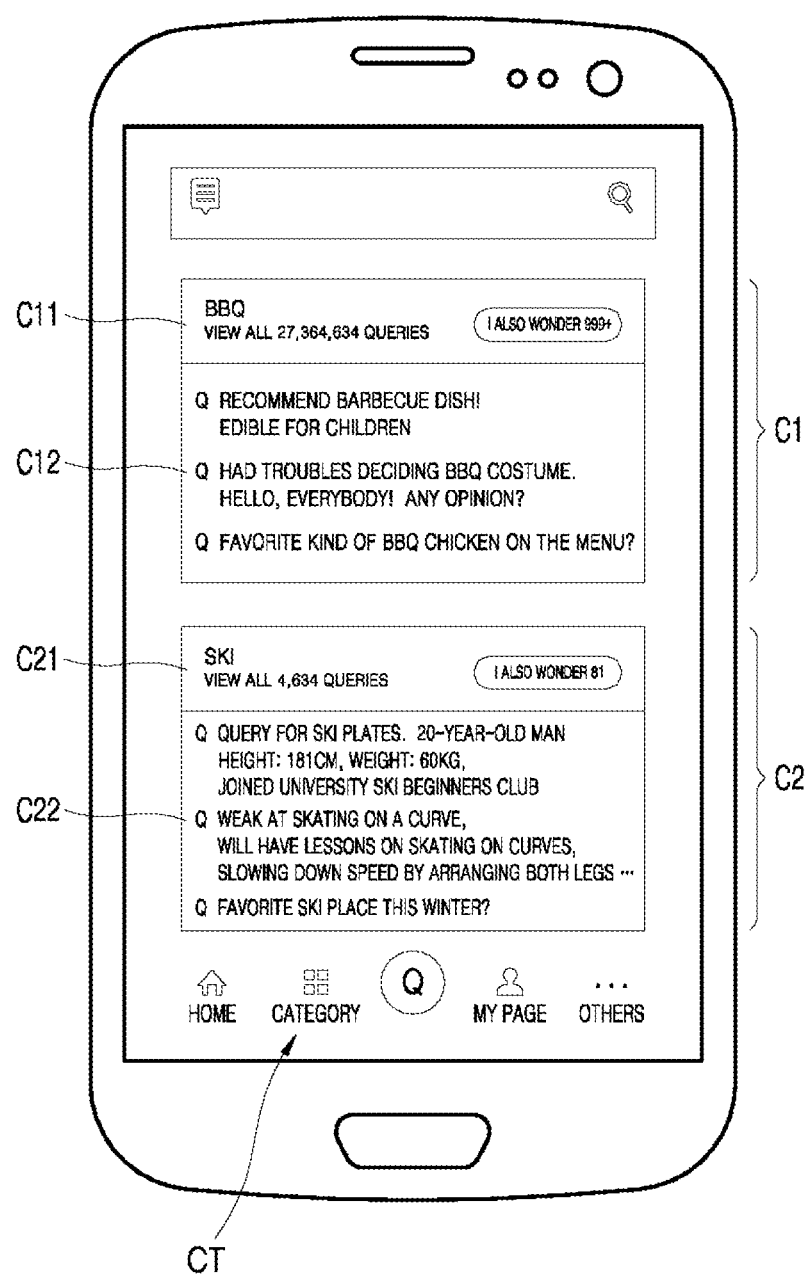
FIG. 8 illustrates a state in which a main category screen provided from a knowledge sharing service providing system according to an example embodiment is displayed on a user terminal.

FIG. 8 illustrates a state in which a main category screen provided from a knowledge sharing service providing system according to an example embodiment is displayed on a user terminal 202. As shown in FIG. 8, a main category screen is displayed on the display device of the user terminal 202, which is illustrated as a smartphone or other like mobile device. It should be noted that according to various embodiments, the main category screen may be displayed on any other type of user terminal 200, such as a desktop personal computer (PC), a laptop PC, a tablet PC, a wearable computing device, and the like. When a category tab CT is selected on a lower menu displayed on the user terminal 202, a main category screen illustrated in FIG. 8 may be provided.

Referring to FIG. 8, at least one category region (e.g., category regions C1, C2, and the like) may be displayed on the main category screen. The category regions C1, C2, may include category information display regions C11 and C21 and category-belonged query data display regions C12 and C22. It should be noted that, although FIG. 8 illustrates two category regions C1 and C2, however, according to various embodiments many more category regions may be displayed in a main category screen.

In the category information display regions C11 and C21, category names, the number of pieces of query data belonging to a category, the number of users who select the category as a field of interest, and the like may be displayed. In this case, when a user selects the category information display regions C11 and C21, an individual category screen for the category (see e.g., FIG. 9) may be moved to or otherwise displayed.

In the category-belonged query data display regions C12 and C22, at least a portion of the query data registered to or otherwise associated with the category may be displayed. For example, the latest three pieces of query data included in the query data registered to the category may be displayed. In this case, when a user selects the query data in either of the query data display regions C12 and C22, an individual query data page (see e.g., FIG. 11) associated with the selected one of the query data display regions C12 and C22 may be displayed.

Figure 9:
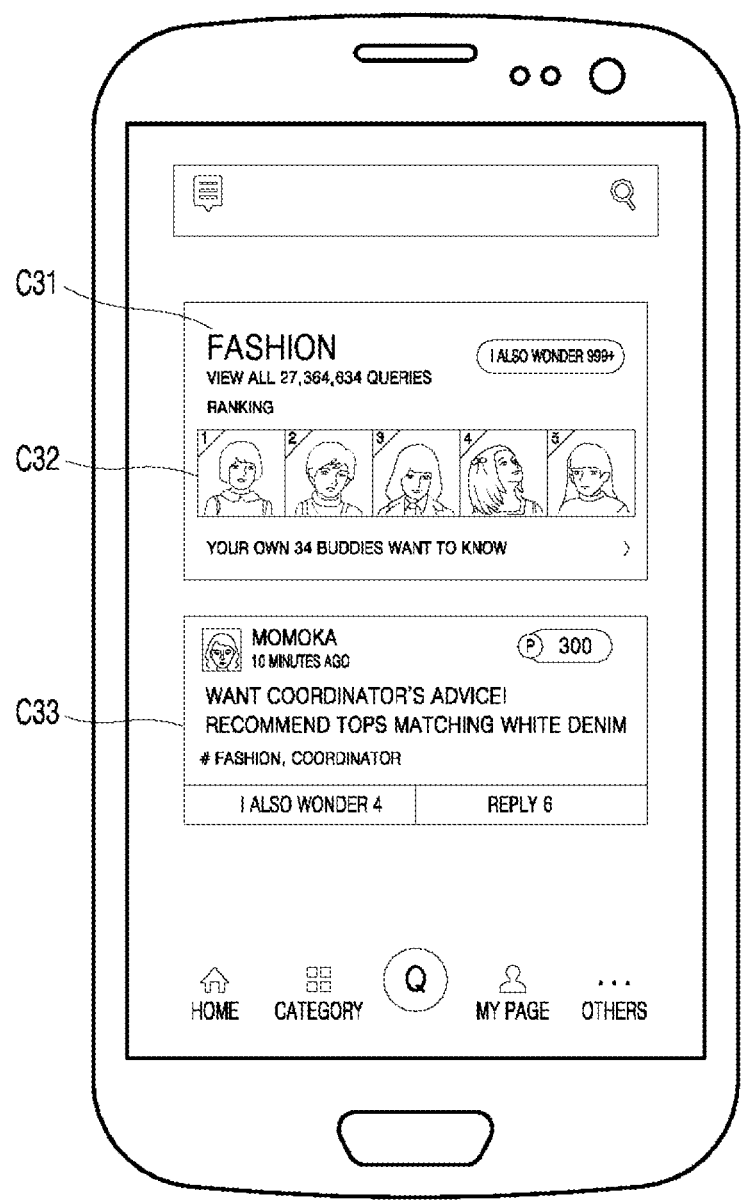
FIG. 9 illustrates a state in which an individual category screen provided from a knowledge sharing service providing system according to an example embodiment is displayed on a user terminal.

FIG. 9 illustrates a state in which an individual category screen provided from a knowledge sharing service providing system according to an example embodiment is displayed on a user terminal 202. As shown in FIG. 9, an individual category screen is displayed on the display device of the user terminal 202, which is illustrated as a smartphone or other like mobile device. It should be noted that according to various embodiments, the individual category screen may be displayed on any other type of user terminal 200, such as a desktop personal computer (PC), a laptop PC, a tablet PC, a wearable computing device, and the like.

Referring to FIG. 9, an individual category information display region C31, an individual category-of-interest user display region C32, and an individual category query data display region C33 may be displayed on the individual category screen. In detail, category names, the number of pieces of query data registered to the category, the number of users who select the category as a field of interest, and the like may be displayed in the individual category information display region C31. In the individual category-of-interest user display region C32, information regarding users who register and/or share the category as a category of interest among contacts of the user may be displayed. In the individual category query data display region C33, at least a portion of the query data registered to the category may be displayed.

Figure 10:
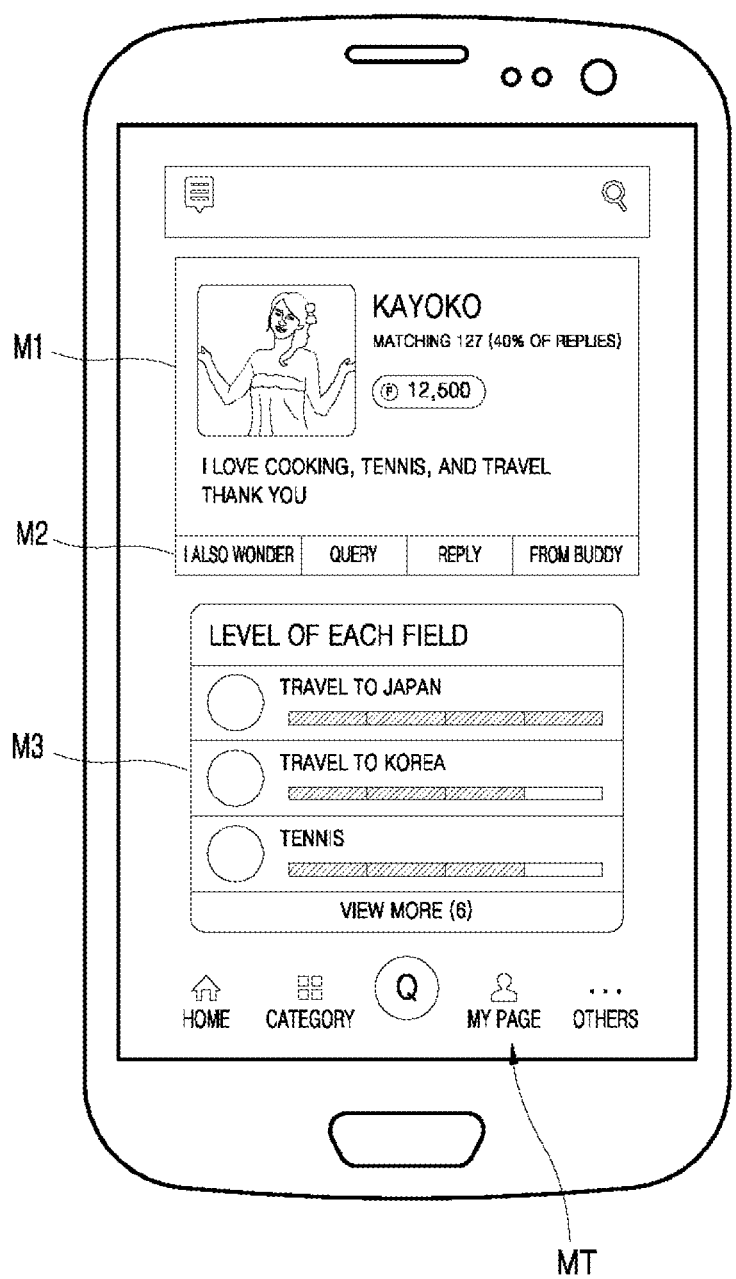
FIG. 10 illustrate a state in which a 'my page' screen provided from a knowledge sharing service providing system according to an example embodiment is displayed on a user terminal.

FIG. 10 illustrate a state in which a 'my page' screen provided from a knowledge sharing service providing system according to an example embodiment is displayed on a user terminal 202. As shown in FIG. 10, a 'my page' screen is displayed on the display device of the user terminal 202, which is illustrated as a smartphone or other like mobile device. It should be noted that according to various embodiments, the 'my page' screen may be displayed on any other type of user terminal 200, such as a desktop personal computer (PC), a laptop PC, a tablet PC, a wearable computing device, and the like.

When a 'my page' tab MT is selected on a lower menu displayed on the user terminal, the 'my page' screen illustrated in FIG. 10 may be provided. According to various embodiments, the 'my page" may be a SNS user profile associated with a user of the user terminal 202. Referring to FIG. 10, a 'my information' display region M1, a 'my registered' data movement region M2, and a 'my level' display region M3 may be displayed on the 'my page' screen.

In 'my information' display region M1, information associated with a user (e.g., the name, ID, profile photo, points, personal statement of the user, etc.) may be displayed, and a 'my-information' change button may also be displayed. In the 'my registered' data movement region M2, tabs for moving to a page including a list of various data the user registered are provided. For example, tabs for moving to a list of a query that the user registered, a query for which the user registered a query sharing request, a query for which the user registered reply data, a query, the recipient of which is set as the user, etc. may be provided. In the 'my level' display region M3, the user's level in each of categories may be displayed. In this case, the user's level in each of the categories may be calculated according to a desired (or alternatively "predetermined") calculation algorithm.

Figure 11:
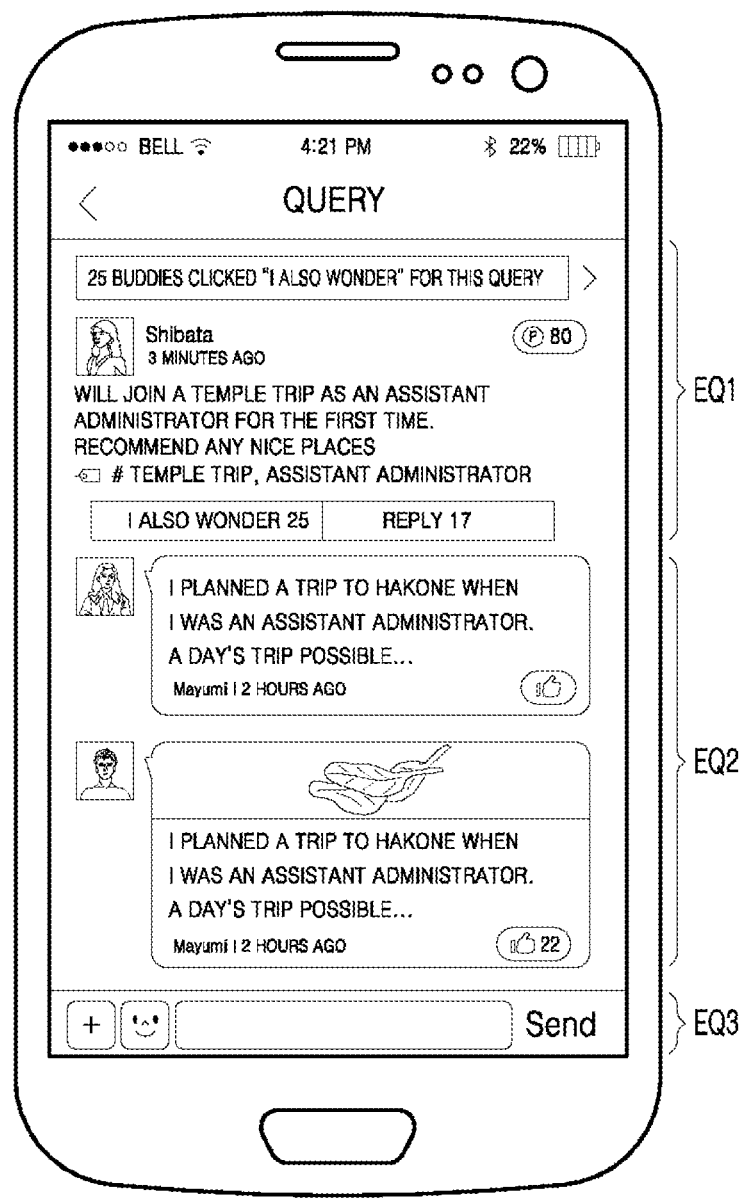
FIG. 11 illustrates an individual query data screen provided from a knowledge sharing service providing system according to an example embodiment is displayed on a user terminal.

FIG. 11 illustrates an individual query data screen provided from a knowledge sharing service providing system according to an example embodiment is displayed on a user terminal. As shown in FIG. 11, an individual query data screen is displayed on the display device of the user terminal 202, which is illustrated as a smartphone or other like mobile device. It should be noted that according to various embodiments, the individual query data screen may be displayed on any other type of user terminal 200, such as a desktop personal computer (PC), a laptop PC, a tablet PC, a wearable computing device, and the like.

Referring to FIG. 11, a query data display region EQ1, a reply data display region EQ2, and a reply data writing region EQ3 may be displayed on the individual query data screen.

In the query data display region EQ1, user information associated with a user who registers and/or shares the query data (for example, a profile photo and a user name registered by the user), a time when the query data is registered and/or shared, a point and/or score assigned to a query, the content of the query, and category information to which the query belongs may be displayed. The query data display region EQ1 may further include a query sharing request registration region and a reply data registration region.

In the reply data display region EQ2, at least one piece of reply data registered for or otherwise associated with the query data may be sequentially displayed. In this case, user information regarding users who wrote the at least one piece of reply data may be also sequentially displayed.

In the reply data writing region EQ3, a reply data input window may be displayed. When the reply data input window is selected, a keypad for inputting reply data may be displayed on the screen (not shown). In embodiments where the individual query data screen is displayed on another type of user terminal 200 (e.g., a desktop personal computer (PC), a laptop PC, a mobile device without a touchscreen, etc.) an indicator may be used to signify that the user of the user terminal 200 has the capacity to input reply data using an input device (e.g., highlighting an input region on the display device, displaying a flashing and/or blinking cursor, and the like).

Figure 12:
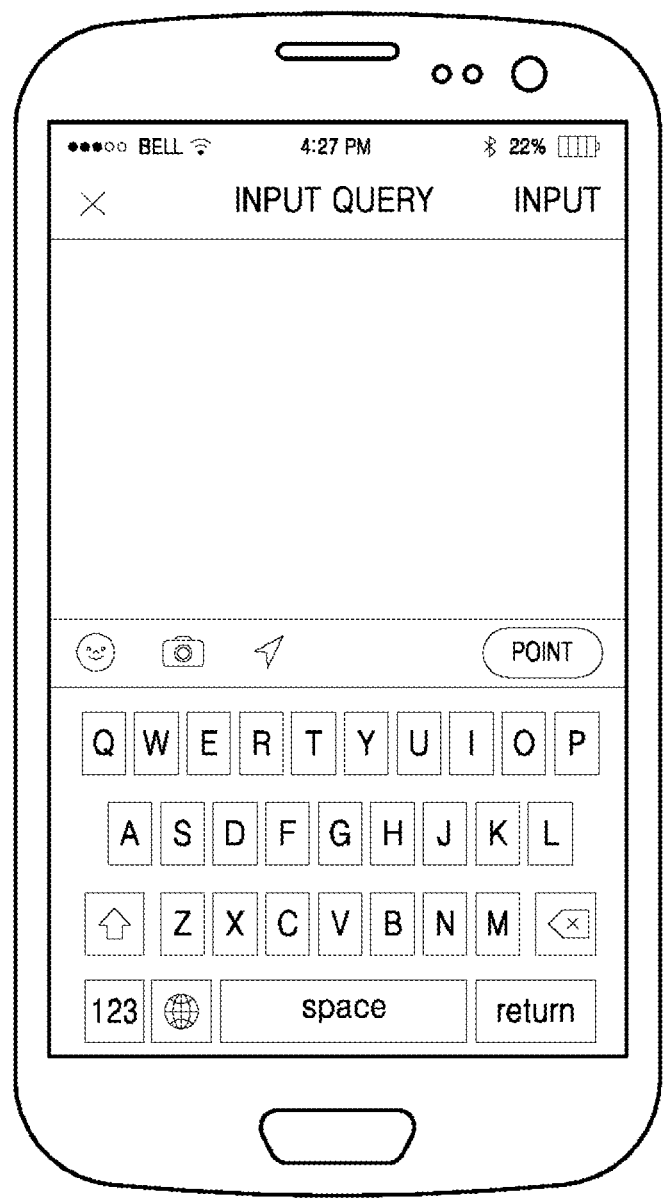
FIGS. 12 to 14 illustrate states in which a query data input screen provided from a knowledge sharing service providing system according to an example embodiment is displayed on a user terminal.
Figure 13:
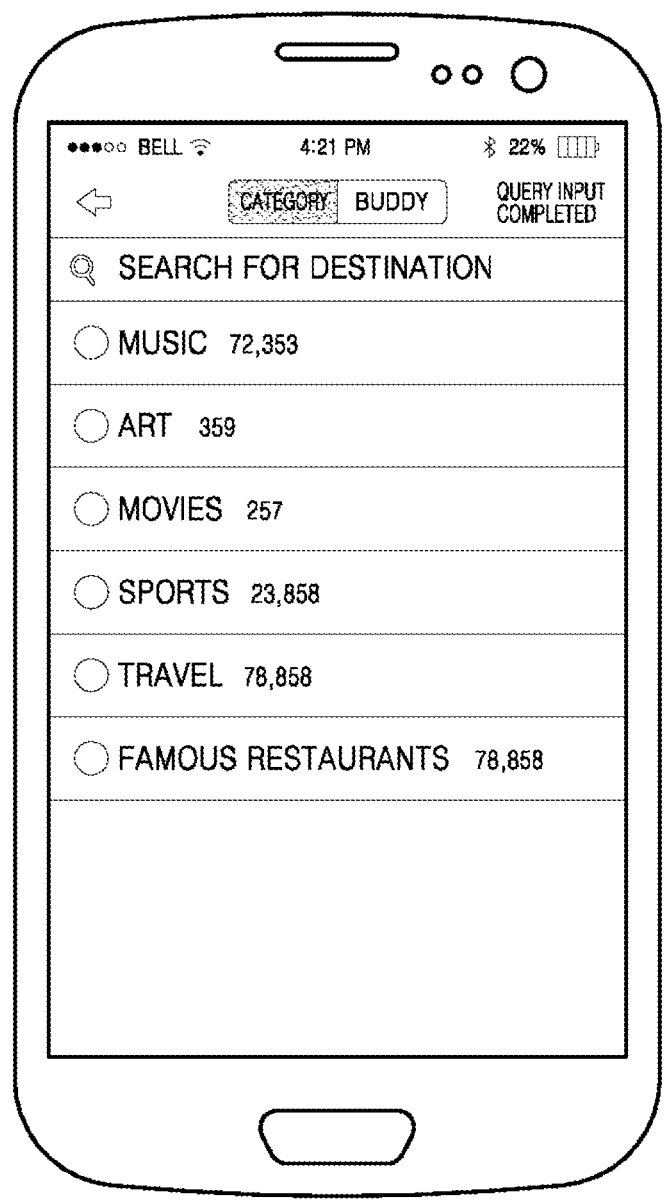
Figure 14:
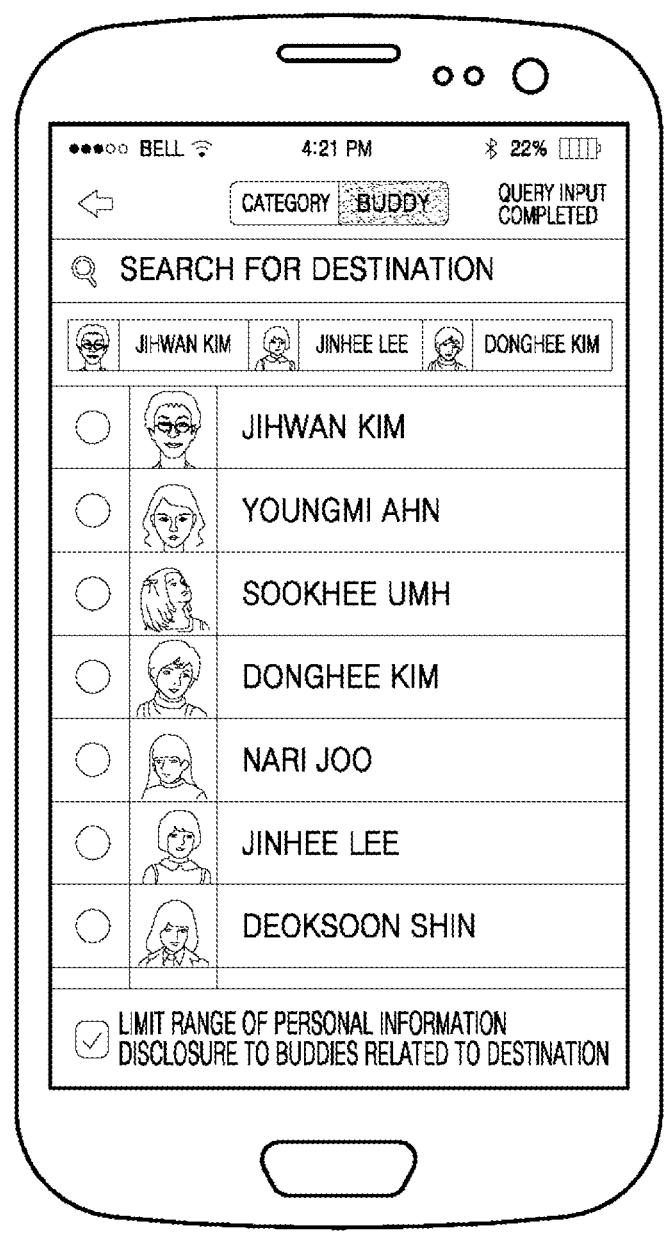

FIGS. 12 to 14 illustrate states in which a query data input screen provided from a knowledge sharing service providing system according to an example embodiment is displayed on a user terminal 202. As shown in FIGS. 12-14, an query data input screen is displayed on the display device of the user terminal 202, which is illustrated as a smartphone or other like mobile device. It should be noted that according to various embodiments, the query data input screen may be displayed on any other type of user terminal 200, such as a desktop personal computer (PC), a laptop PC, a tablet PC, a wearable computing device, and the like.

First, when a user selects to input query data, a query data input window including a message input window and a keypad is displayed on a window. In this state, a query may be input using the keypad displayed on the screen, as illustrated in FIG. 12. A user may press a point setting button P to set a point and/or score to be assigned to a best answerer of the query beforehand. If a point and/or score is not set, a default point and/or score may be set. In this case, the default point and/or score may be '0'. In embodiments where the query data input screen is displayed on another type of user terminal 200 (e.g., a desktop personal computer (PC), a laptop PC, a mobile device without a touchscreen, etc.) a query may be input using an input device (e.g., a keyboard, a mouse, etc.).

When the inputting of the query data is completed and thus an input button I is pressed, a destination setting screen may be displayed as illustrated in FIGS. 13 and 14. In a knowledge sharing service providing system according to an example embodiment, one or more 'categories' or one or more 'friends' or contacts may be set as a destination of the query data.

FIG. 13 illustrates a case in which the destination of the query data is set to be a 'category'. As illustrated in FIG. 13, a user may set at least one category among a plurality of categories as the destination of the query data. As described above, when a certain category is set as the destination of the query data, the query data may be registered or otherwise selected to include information regarding the category and provided on a main category screen (see e.g., FIG. 8) or an individual category screen (see e.g., FIG. 9) for the category. Furthermore, the query data may be provided in a timeline of a user who sets the category as a field of interest.

FIG. 14 illustrates a case in which a destination of query data is set to be a 'friend'. As illustrated in FIG. 14, a user may set at least one user who is his/her contact as the destination of the query data. As described above, when a contact is set as the destination of the query data, the query data may be displayed in a timeline or other microblogging feature associated with the contact. When the destination of the query data is set to be 'friends', whether a query sharing request is to be performed may be further selected. In this case, when the query sharing request is set to not be performed, the contact who receives the query data may be set to be able to write his/her reply data but not to be able to share his/her reply data with other contacts.

Figure 15:
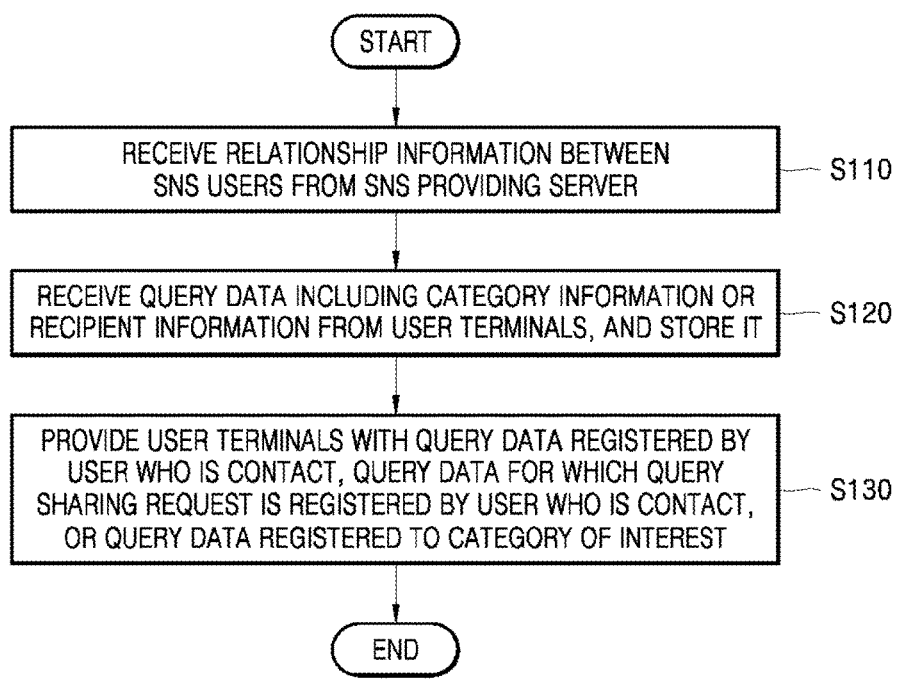
FIG. 15 is a flowchart of a method of providing a knowledge sharing service, according to an example embodiment.

FIG. 15 is a flowchart of a method of providing a knowledge sharing service, according to an example embodiment. For illustrative purposes, the method of providing a knowledge sharing service of FIG. 15 is described as being performed by the knowledge sharing service providing server 100 as described with regards to FIGS. 1-14. However, it should be noted that any other network element that has a same or similar configuration as the knowledge sharing service providing server 100 may operate the method of providing a knowledge sharing service.

Referring to FIG. 15, as shown at operation S110, the knowledge sharing service providing server 100 receives relationship information between SNS users from an SNS providing server. At operation S120, the knowledge sharing service providing server 100 receives query data including category information and/or recipient information from user terminals 200 and stores the received query data in a corresponding database. At operation S130, the knowledge sharing service providing server 100 provides the user terminals 200 with query data registered by a user who is a contact, query data for which a query sharing request is registered by a user who is a contact, and/or query data registered to a category of interest registered beforehand and/or selected by a user, based on the relationship information between the SNS users.

Referring back to operation S110, in various embodiments, the SNS relationship information linking unit 120 receives relationship information between SNS users from the SNS providing server 300 and manages the relationship information. That is, using the SNS relationship information linking unit 120, the knowledge sharing service providing server 100 receives the relationship information between users from the SNS providing server 300 and provides a knowledge sharing service based on the relationship information.

Referring back to operation S120, the knowledge sharing service providing server 100 receives category information and/or query data including recipient information from user terminals 200 and stores the received category information and/or query data in DB 160. In detail, the query data management unit 130 receives query data from the user terminal 200, stores the query data in the query DB 161 and manages the query data. In this case, the query data received from the user terminal 200 may include category information to which a query belongs and/or information associated with a recipient to which the query is to be delivered.

When the query data management unit 130 receives a query sharing request requesting the query data, the query data management unit 130 may store the query sharing request in the query DB 161 in association with the query data, such that the query sharing request is matched with the query data according to known methods. For example, in various embodiments, the query data management unit 130 may index the query data according to information associated with the query sharing request. As described above, if the query sharing request is stored to match the query data, when a best reply to the query data is selected, the best reply may be transmitted to users who transmit the query sharing request.

When the query data management unit 130 receives reply data for the query data, the query data management unit 130 may store the reply data in the query DB 161 to match the query data according to known methods. For example, in various embodiments, the query data management unit 130 may index the reply data according to information associated with the query sharing request and/or any other information associated with the reply data. If the reply data is stored to match the query data, when a piece of reply data among a plurality of pieces of reply data for the query data is selected as a best reply, the best reply may be transmitted to users who registered the plurality of pieces of reply data.

Referring back to operation S130, the knowledge sharing service providing server 100 provides, to the user terminals 200 based on the relationship information between the SNS users, query data registered by a user who is a contact, query data for which a query sharing request is registered by a user who is a contact, and/or query data registered to a category of interest registered beforehand and/or selected by a user. In detail, the timeline management unit 140 provides the user terminal 200 with at least one query data such that the at least one query data is displayed on the user terminal 200 in the form of a timeline or other like microblogging feature. In this case, the timeline management unit 140 may provide the user terminal 200 with query data registered by a user who is a contact, query data for which a query sharing request is registered by a user who is a contact, or query data registered to a category of interest registered beforehand and/or selected by a user such that the query data is displayed on the user terminal 200 in the form of a timeline or other like microblogging feature. Furthermore, the timeline management unit 140 may further provide query data registered to or otherwise associated with a category of interest registered by a user who is a contact. Otherwise, the timeline management unit 140 may provide query data to only a user terminal of a user who is designated as a recipient by a writer of a query. In various embodiments, the timeline management unit 140 may display the query data on the user terminal 200 in the form of a timeline in chronological order in which articles are posted. Furthermore, in various embodiments, the timeline management unit 140 may further provide recommended query data received from a knowledge sharing service providing system.

As described above, according to the one or more of the above example embodiments, a knowledge sharing service whereby a user who is a contact is queried based on relationship information between SNS users and a user who receives the query requests to share the query so as to distribute the query to another user who is a contact of the user may be provided, thereby rapidly transmitting the query to reliable answerers and receiving a reliable reply.

As described above, according to the one or more of the above example embodiments, with a knowledge sharing service providing system and method based on relationship information between SNS users, it is possible to rapidly transmit a query to reliable contacts and receive a reliable reply to the query.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It should be understood that the example embodiments described therein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A knowledge sharing service providing system, the system comprising:
    a social network service (SNS) providing server configured to provide a SNS platform, the SNS providing server configured to store relationship information between a first user and a second user, the relationship information between the first user and the second user indicating a connection between the first user and the second user; and
    a knowledge sharing service providing server including a processor, the processor configured to,
        store query data received from a first terminal of the first user,
        match a query sharing request with the query data, the query sharing request received from a second terminal of the second user, the query sharing request being a request to disseminate the query data to at least one user connected to the second user,
        store a query sharing request in association with the query data,
        provide the query data matched with the query sharing request to a third terminal of a third user, the third user being connected with the second user in the SNS platform,
        receive reply data associated with the query data,
        match the reply data with the query data, and
        store the reply data in association with the query data,
    wherein in response to at least one portion of the reply data associated with the query data being selected as a best reply by the first user, the system is configured to assign a desired score to a user of a terminal that has provided the portion of the reply data selected as the best reply.

2. The system of claim 1, wherein the query data transmitted from the first user is associated with category information, and the processor is further configured to:
    provide the query data to the second terminal in response to at least a portion of the category information associated with the query data being same as a portion of information associated with a category of interest selected by the second user.

3. The system of claim 1, wherein the processor is further configured to:
    provide the query data to the second terminal based on a level of intimacy indicated by the relationship information.

4. The system of claim 1, wherein the processor is further configured to:
    provide the selected best reply to at least one of the second terminal and the third terminal.

5. The system of claim 1, wherein the processor is further configured to:
    transmit an indication to the user of the terminal that has provided the selected portion of the reply data, the indication indicating that the selected portion of the reply data is selected as the best reply.

6. The system of claim 1, wherein the assigned score is set by the first user.

7. A method of providing a knowledge sharing service by a knowledge sharing service providing server that includes a processor, the method comprising:
    receiving, by the processor, query data from a first terminal of a first user, the first user connected to a second user according to first relationship information between the first user and the second user, the first relationship information between the first user and the second user defined by a social network service (SNS);
    transmitting, by the processor, the query data to a second terminal of the second user based on the first relationship information between the first user and the second user;
    providing, by the processor, a first control element for selecting a query sharing request, the query sharing request being a request from the second user to disseminate the query data to a third user, the third user connected to the second user according to second relationship information between the second user and the third user, the second relationship information between the second user and the third user defined by the SNS;
    storing, by the processor, information for transmitting the query data to a third terminal of the third user in response to the second user selecting the query sharing request using the first control element;
    transmitting, by the processor, the query data to the third terminal according to the stored information for transmitting the query data;
    providing a second control element for inputting reply data in response to the query data;
    in response to the reply data being input using the second control element, transmitting the reply data to at least one of the first terminal, the second terminal, and the third terminal; and
    providing the first user with a third control element for setting a score to be associated with the query data, the score assigned to a user who inputs the reply data.

8. The method of claim 7, wherein the query data is associated with category information, and the transmitting the query data to the second terminal comprises:
    transmitting the query data to the second terminal in response to at least a portion of the category information associated with the query data being same as a portion of information associated with a category of interest selected by the second user.

9. The method of claim 7, wherein the second user is selected by the first user based on the relationship information between the first user and the second user.

10. A knowledge sharing service providing server including a processor, the processor configured to:

obtain first relationship information between a first user and a second user and second relationship information between the second user and a third user, the first relationship information and the second relationship information being defined by a social network service (SNS);

receive query data from a first terminal of the first user;

provide the received query data to a second terminal of the second user based on the first relationship information;

receive a query sharing request from the second terminal, the query sharing request received from a second terminal of the second user, the query sharing request being a request to disseminate the query data to at least one user connected to the second user;

provide the received query data to a third terminal of the third user based on the received query sharing request and the second relationship information;

receive reply data from at least one of the first terminal, a second terminal of the second user, and a third terminal of a third user; and provide the reply data to at least one of the first terminal, the second terminal, and the third terminal;

wherein in response to at least one portion of the reply data associated with the query data being selected as a best reply by the first user, the server is configured to assign a desired score to a user of a terminal that has provided the portion of the reply data selected as the best reply.

11. The knowledge sharing service providing server of claim 10, wherein the processor is further configured to:
store the received query sharing request in association with the query data; and
store the received reply data in association with the received query data.

12. The knowledge sharing service providing server of claim 10, wherein the processor is further configured to:
obtain relationship information between the first user and each of a plurality of other users within the SNS in real time; and
provide the received query data to selected ones of the plurality of other users.

13. The knowledge sharing service providing server of claim 10, wherein the processor is further configured to:
receive a plurality of query sharing requests from corresponding ones of a plurality of terminals; and
distribute at least a portion of the query data to other users within the SNS according to each received one of the plurality of query sharing requests,
wherein the plurality of query sharing requests include the query sharing request from the second terminal, and the plurality of terminals include the first, second, and third terminals.

14. The knowledge sharing service providing server of claim 13, wherein the processor is further configured to:
receive a plurality of query sharing requests from corresponding ones of a plurality of terminals; and
distribute at least a portion of the query data to other users within the SNS according to each received one of the plurality of query sharing requests.

15. A non-transitory computer-readable storage medium including program code, which when executed by a processor, configures the processor to:
receive query data from a first terminal of a first user, the first user connected to a second user according to relationship information between the first user and the second user, the relationship information between the first user and the second user being defined by a social network service (SNS);
transmit the query data to a second terminal of the second user based on the relationship information between the first user and the second user;
provide a first control element for selecting a query sharing request, the query sharing request being a request from the second user to share the query data with a third user, the third user being to the second user according to relationship information between the second user and the third user, the relationship information between the second user and the third user being defined by the SNS;
transmit the query data to a third terminal of the third user in response to the second user selecting the query sharing request using the first control element;
provide a second control element for inputting rely data in response to the query data;
in response to the reply data being input using the second control element, transmit the reply data to at least one of the first terminal, the second terminal, and the third terminal; and
provide the first user with a third control element for setting a score to be associated with the query data, the score assigned to a user who inputs the reply data.

* * * * *